(12) United States Patent
Gupta et al.

(10) Patent No.: US 10,965,886 B2
(45) Date of Patent: Mar. 30, 2021

(54) SYSTEM AND METHOD OF GENERATING A COMPOSITE FRAME

(71) Applicant: CANON KABUSHIKI KAISHA, Tokyo (JP)

(72) Inventors: Amit Kumar Gupta, Epping (AU); Quang Tuan Pham, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 16/186,942

(22) Filed: Nov. 12, 2018

(65) Prior Publication Data

US 2019/0182436 A1    Jun. 13, 2019

(30) Foreign Application Priority Data

Dec. 8, 2017 (AU) ................................. 2017272325

(51) Int. Cl.
*H04N 5/272* (2006.01)
*G06K 9/00* (2006.01)
*G11B 27/036* (2006.01)
*H04N 5/262* (2006.01)

(52) U.S. Cl.
CPC ......... *H04N 5/272* (2013.01); *G06K 9/00724* (2013.01); *G06K 9/00751* (2013.01); *G11B 27/036* (2013.01); *H04N 5/2625* (2013.01); *G06K 2009/00738* (2013.01); *H04N 5/2627* (2013.01)

(58) Field of Classification Search
CPC ........... G06K 9/00724; G06K 9/00744; G06K 9/00335; G06K 9/0061
See application file for complete search history.

(56) References Cited

U.S. PATENT DOCUMENTS

| | | | |
|---|---|---|---|
| 6,188,777 B1 * | 2/2001 | Darrell ............... | G06K 9/00362 348/169 |
| 6,353,679 B1 * | 3/2002 | Cham ................. | G06K 9/6226 382/181 |
| 6,873,713 B2 * | 3/2005 | Okazaki ............. | G06K 9/00268 382/118 |
| 6,901,110 B1 * | 5/2005 | Tsougarakis ........... | H04N 5/145 348/E5.066 |

(Continued)

OTHER PUBLICATIONS

Laura Teodosio, et al., "Salient Video Stills: Content and Context Preserved", ACM Trans. Multimedia Comput. Commun. Appl. Feb. 1, 2005, pp. 16-36.

(Continued)

*Primary Examiner* — Yosef Kassa
(74) *Attorney, Agent, or Firm* — Canon U.S.A., Inc. IP Division

(57) ABSTRACT

A system and method of generating a composite frame from a video capturing a plurality of persons. The method comprises determining a plurality of frames corresponding to occurrence of a predetermined event in the video; determining an importance score for each of the plurality of persons in the determined plurality of frames, the importance score determined based on a type of interaction detected between each of the plurality of persons with an activity object; and selecting one or more of the plurality of persons based on the determined importance score to generate a composite frame of the event including the selected one or more persons.

19 Claims, 24 Drawing Sheets

(56) References Cited

U.S. PATENT DOCUMENTS

| | | | |
|---|---|---|---|
| 7,006,950 B1 * | 2/2006 | Greiffenhagen | G06T 7/77 |
| | | | 703/2 |
| 7,042,493 B2 | 5/2006 | Prandoni et al. | |
| 7,194,110 B2 * | 3/2007 | Qian | G06T 7/246 |
| | | | 348/169 |
| 7,289,648 B2 * | 10/2007 | Liu | G06K 9/00275 |
| | | | 345/420 |
| 7,603,255 B2 * | 10/2009 | Case, Jr. | A63B 24/0003 |
| | | | 702/182 |
| 7,676,332 B2 * | 3/2010 | Damen | A61B 5/222 |
| | | | 600/300 |
| 7,783,085 B2 * | 8/2010 | Perlmutter | G06K 9/00281 |
| | | | 382/118 |
| 7,983,442 B2 * | 7/2011 | Chiang | G06T 7/254 |
| | | | 382/100 |
| 8,102,406 B2 | 1/2012 | Peleg et al. | |
| 8,315,463 B2 * | 11/2012 | Gallagher | G06K 9/00288 |
| | | | 382/190 |
| 8,355,083 B2 * | 1/2013 | Keiser | G06T 13/00 |
| | | | 348/559 |
| 8,441,476 B2 * | 5/2013 | Gloudemans | G06T 15/20 |
| | | | 345/419 |
| 8,705,810 B2 * | 4/2014 | Wang | G06F 16/70 |
| | | | 382/118 |
| 8,826,325 B2 * | 9/2014 | Redol | H04N 21/812 |
| | | | 725/32 |
| 8,848,058 B2 | 9/2014 | Ayer et al. | |
| 8,913,797 B1 * | 12/2014 | Siddavanahalli | G06F 16/9535 |
| | | | 382/118 |
| 9,069,862 B1 * | 6/2015 | Perkowitz | G06F 16/285 |

OTHER PUBLICATIONS

Navneet Dalal, et al., "Histograms of oriented gradients for human detection", Proceedings of the 2005 IEEE Computer Society Conference on Computer Vision and Pattern Recognition (CVPR'05), vol. 1, IEEE, 2005.

Heng Wang, et al., "Action Recognition with Improved Trajectories", in Proceedings of the IEEE Conference on Computer Vision and Pattern Recognition, ICCV, pp. 3551-3558, Dec. 2013.

Jorge Sanchez, et al., "Image Classification with the Fisher Vector: Theory and Practice", International Journal of Computer Vision, Springer Verlag, 2013, vol. 105, No. 3, pp. 222-245.

Simon Lacoste-Julien, et al., "Block-Coordinate Frank-Wolfe Optimization for Structural SVMs", Proceedings of the 30th International Conference on Machine Learning, Atlanta, Georgia, USA, JMLR: W&CP vol. 28, 2013.

U.S. Appl. No. 14/134,205, filed Sep. 18, 2018.

* cited by examiner

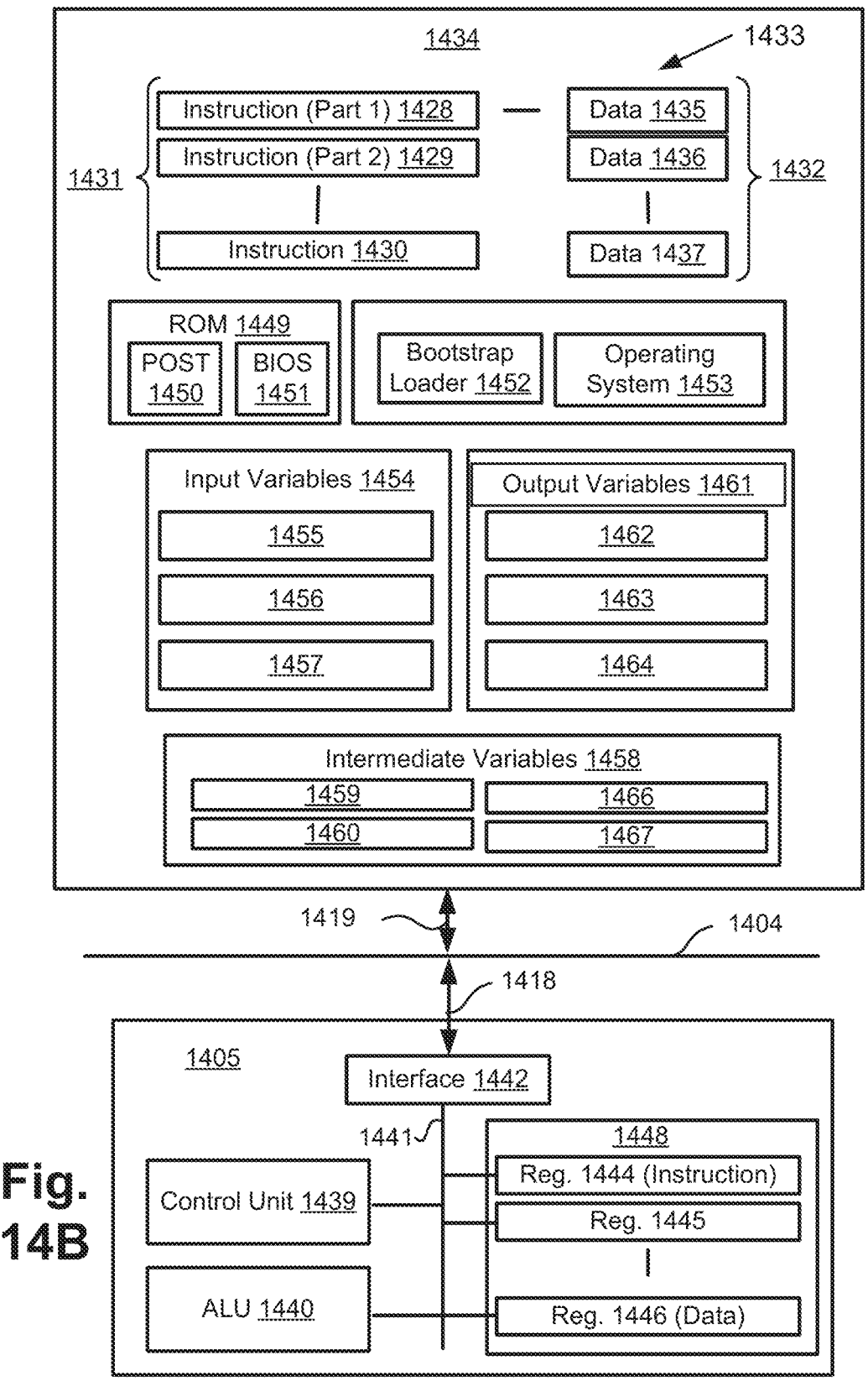

SYSTEM AND METHOD OF GENERATING A COMPOSITE FRAME

REFERENCE TO RELATED APPLICATION(S)

This application claims the benefit under 35 U.S.C. § 119 of the filing date of Australian Patent Application No. 2017272325, filed 8 Dec. 2017, hereby incorporated by reference in its entirety as if fully set forth herein.

TECHNICAL FIELD

The present invention relates to generating a composite frame of a video action event using importance scores of persons estimated based on persons and object of interest. The present invention also relates to a method, apparatus and system to generate a composite frame of a video action event using importance scores of persons estimated based on persons and object of interest being interacted with by the persons.

BACKGROUND

Video is a common format to capture moments of action due to the fast-paced actions involved. However, video is not always suitable as a reproduction format for a moment, especially when a static medium is involved. In one example, important sport moments such as a celebrated goal frequently appear on static mediums such as billboards, posters, and photo books. Memorabilia and merchandise are also important media with large commercial value. Even on a dynamic medium such as an electronic screen, it is not always desirable to play a video from beginning to end. A static image representation of the video is also useful as thumbnail for video indexing.

A known sport summary method generates a summary of a motion of a person or of a team by first defining different templates for different motions. Each of a number of pre-defined templates are related to a number of key positions related to the motion. The templates are used to extract matching images from the input video sequence representing the motion. The extracted images are then displayed in a sequence to generate a summary frame. The method relies on pre-determined templates for summarizing an action and mainly expects a single person motion sequence.

Another known method generates a summary of a video sequence by generating a relatively short synopsis video. The short synopsis video is generated by selecting two or more source objects and then superimposing the selected objects using the objects' spatial position in to shorter synopsis video. The method does not select relevant source objects to create a perceptually relevant sports summary.

A further known method tracks foreground objects and renders the objects back into the image at regular time intervals to create a story line of a pre-selected duration. The method does not handle multiple players' scenes well and can lead to a cluttered storyline.

There is a need for an improved method which generates a more effective sport action summary image.

SUMMARY

It is an object of the present invention to substantially overcome, or at least ameliorate, one or more disadvantages of existing arrangements.

One aspect of the present disclosure provides a computer-implemented method of generating a composite frame from a video capturing a plurality of persons, the method comprising: determining a plurality of frames corresponding to occurrence of a predetermined event in the video; determining an importance score for each of the plurality of persons in the determined plurality of frames, the importance score determined based on a type of interaction detected between each of the plurality of persons with an activity object; and selecting one or more of the plurality of persons based on the determined importance score to generate a composite frame of the event including the selected one or more persons.

According to another aspect, the plurality of frames corresponding to the predetermined event are determined based on action moments and roles associated with the plurality of persons.

According to another aspect, the importance score for each of the plurality of persons is determined based on a distance between each of the persons and the activity object in the determined plurality of frames corresponding to the predetermined event.

According to another aspect, the importance score for each of the plurality of persons is further based on a role of the person in the determined plurality of frames corresponding to the predetermined event.

According to another aspect, the composite frame of the event comprises a series of instances of the activity object and one or more of the plurality of persons at selected action moments superimposed on a background image.

According to another aspect, the background image is derived from a plurality of frames corresponding to the predetermined event using temporal median at each pixel.

According to another aspect, the background image is derived from a plurality of frames corresponding to the predetermined event using multi-mode scene modelling.

According to another aspect, the background image is derived from a plurality of frames corresponding to the predetermined event using a deep auto-encoder network.

According to another aspect, time ordering of the activity object and the one or more persons included in the composite frame is represented by a variation in transparency.

According to another aspect, time ordering of the activity object and the one or more persons included in the composite frame is represented by varying colour spectra or shading.

According to another aspect, the type of interaction is based on at least one of a predetermined event, a distance between the activity object and the plurality of persons, and a role of the plurality of persons.

According to another aspect, generating the composite frame further comprises estimating clutter of the composite frame by determining a percentage of number of pixels occupied by the plurality of persons in the composite frame with respect to total pixels in the composite frame.

According to another aspect, the method further comprises excluding an instance of the event from the composite frame based on a low importance score associated with the instance and the estimated clutter being above a predetermined threshold.

According to another aspect, the method further comprises detecting one or more action moments captured in the video using a trained classifier and determining the frames based on the action moment corresponding to the predetermined event.

According to another aspect, determining the plurality of frames corresponding to occurrence of the predetermined event comprises determining tracks relating to each of the plurality of persons and the activity object in the video and detecting occurrence of an action moment using the determined tracks.

According to another aspect, the importance score is determined based upon an aggregate importance score calculated for each person across all of the determined frames corresponding to the event.

According to another aspect, the plurality of persons are players of a ball sport, the activity object is the ball and the predetermined event is one of a plurality of events associated with the ball sport.

Another aspect of the present disclosure provides a non-transitory computer readable storage medium storing program instructions for generating a composite frame from a video capturing a plurality of persons, the program comprising: code for determining a plurality of frames corresponding to occurrence of a predetermined event in the video; code for determining an importance score for each of the plurality of persons in the determined plurality of frames, the importance score determined based on a type of interaction detected between each of the plurality of persons with an activity object; and code for selecting one or more of the plurality of persons based on the determined importance score to generate a composite frame of the event including the selected one or more persons for display.

Another aspect of the present disclosure provides apparatus for generating a composite frame from a video capturing a plurality of persons, comprising: a processor; and a memory device storing a software program for directing the processor to perform a method comprising the steps of: determining a plurality of frames corresponding to occurrence of a predetermined event in the video; determining an importance score for each of the plurality of persons in the determined plurality of frames, the importance score determined based on a type of interaction detected between each of the plurality of persons with an activity object; and selecting one or more of the plurality of persons based on the determined importance score to generate a composite frame of the event including the selected one or more persons.

Another aspect of the present disclosure provides a system comprising: at least one image capture devices for capturing video of a plurality of persons; a processor; and a memory device storing a software program for directing the processor to perform a method comprising the steps of: determining a plurality of frames corresponding to occurrence of a predetermined event in the video; determining an importance score for each of the plurality of persons in the determined plurality of frames, the importance score determined based on a type of interaction detected between each of the plurality of persons with an activity object; and selecting one or more of the plurality of persons based on the determined importance score to generate a composite frame of the event including the selected one or more persons.

Other aspects of the invention are also disclosed.

BRIEF DESCRIPTION OF THE DRAWINGS

One or more embodiments of the invention will now be described with reference to the following drawings, in which:

FIGS. 14A and 14B form a schematic block diagram of a general purpose computer system upon which arrangements described can be practiced;

DETAILED DESCRIPTION INCLUDING BEST MODE

Figure 1:
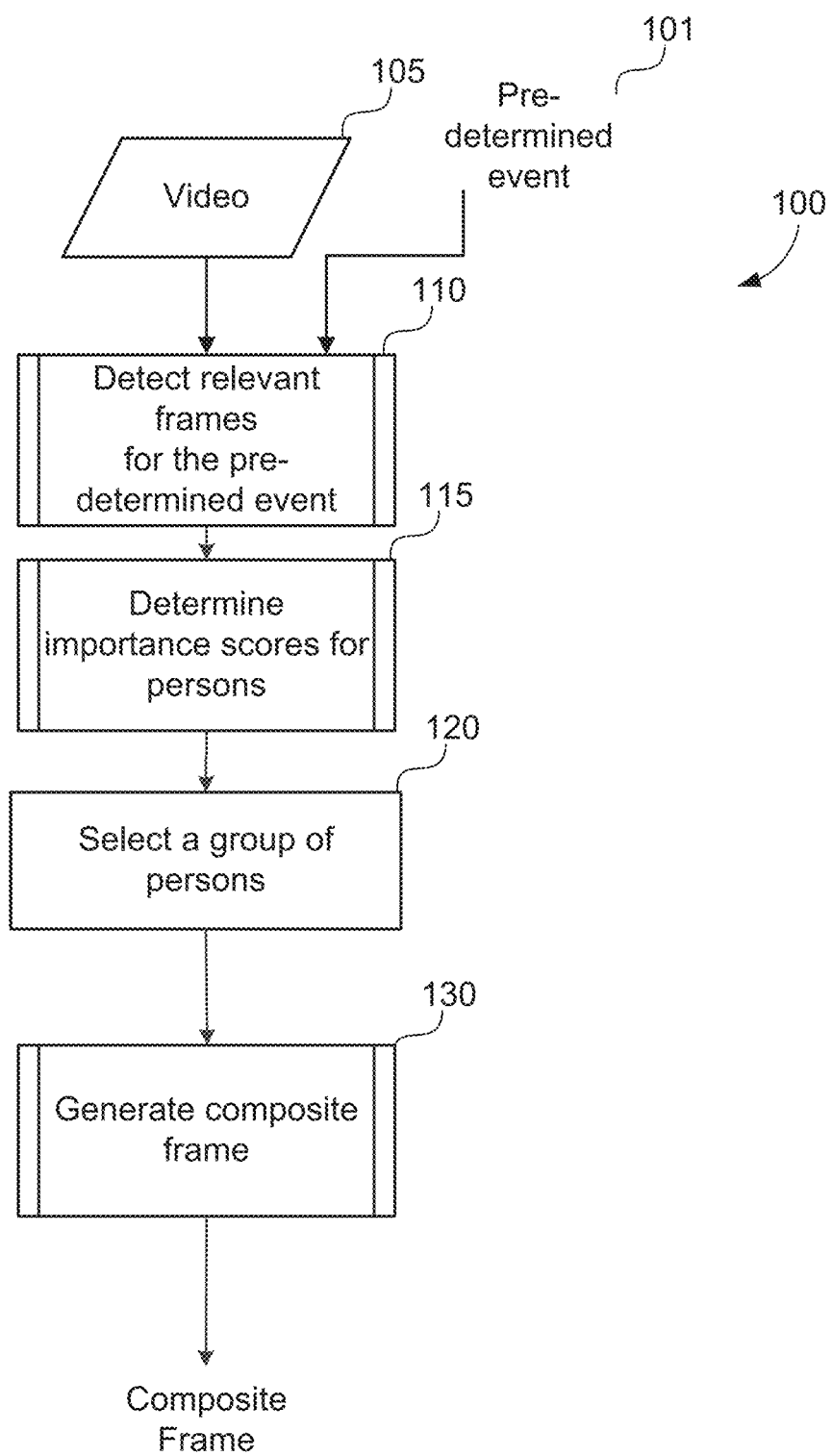
FIG. 1 shows a schematic flow diagram of creating a composite frame representing a summary of an input action event.

Where reference is made in any one or more of the accompanying drawings to steps and/or features, which have the same reference numerals, those steps and/or features have for the purposes of this description the same function(s) or operation(s), unless the contrary intention appears.

An image summary of a video event consisting of two or more frames is beneficial in many scenarios. An image summary can be used in many applications such as displaying as a summary image for an event, print publication and sports coaching.

The present disclosure relates to a computer-implemented method of generating a composite frame representing an event summary. In other words, the present disclosure describes a method of representing a composite summary of an action which happened over a span of two or more images in a video sequence of the event.

For the purpose of this present disclosure the following terms are defined:

The term "detection" is used to refer to the joint task of localising and classifying. For example, detecting a set of actions of interest includes localising all the occurrences (also called instances) of the actions of interest in a video sequence and assigning a class label to the localised instances. Localisation is defined below.

The term "recognition" may also be used interchangeably with the term "detection".

The term "event" refers to an activity including two persons occurring over a period of time.

The terms "people" and "persons" refer to a group of interacting agents. Each agent in the group is referred to as a person. In the context of a sport, the persons relate to players of the sport. Depending on an application for which the invention is used, the term 'people' and 'person' can also relate to animals or to other objects capable of performing a movement action such as robots.

The term activity object refers to the object used by or interacted with by the persons as part of the event. A few examples of activity objects for different types of sport are provided in Table 1.

TABLE 1

Activity objects

| Sport | Activity object |
| --- | --- |
| Futsal, Soccer, Tennis, Table tennis, Squash, Volleyball, Basketball, Netball, Water polo, Baseball, Rugby, American football, Golf | Ball |
| Ice Hockey | Puck |
| Badminton | Shuttle |
| Sprint relay | Baton |

The term "action" refers to the act of doing something at a particular timestamp in order to make something happen, and an action involves with only one person. For example, a "kicking" action occurs at the moment when a ball is kicked by a soccer player.

The term "event" refers to a pair of spatio-temporally interacting actions. An event typically concerns two persons or a person and an object, and corresponds to a temporal interval. The two persons engaged in an event are termed as play-agent and play-target, where play-agent initiates the event while play-target is the recipient of the event. For example, a "pass" event typically involves with two soccer players—a first player (play-agent) kicks the ball at time $t_1$ and a second player (play-target) from the same team obtains the control of the ball at a later time $t_2$. In the present disclosure, the terms play-agent and play-target are used to refer to interacting persons in general, and their use is not limited to the events in sport.

The term "role" is associated with a person. In particular, in the present disclosure, the term role refers to a set of expected behaviour, rights and obligations related to the functionality of the corresponding person in a group of people. Specifically, the role of a person exists beyond the event that the person is involved in. For example, someone may have the role of 'shop assistant', 'security personnel', 'medical personnel' or 'goal keeper' in a scene, and the role is valid even during those temporal intervals that the person is not involved in any event of interest. Some literature may use the term 'social role' to refer to the same concept.

The term "video sequence" is used to refer to a recording of an event or scene as a set of images with temporal ordering. The images forming a video sequence are called 'frames.' The order of frames in a video sequence is determined by frame numbers. The frame number may be used to refer to the relative timing of an action or event in a video sequence. An action which happens after another action must be associated with a later time (i.e., a succeeding frame number).

The term "video segment" may be used to refer to the whole or part of a video sequence. The frames in a video segment are temporally consecutive.

The "localisation of an action" refers to associating an action to an object involved in the action, and temporally localising by associating the action to a particular frame in the video sequence. The localisation of event refers to the task of finding the spatial and temporal extent of the event. In particular, localisation of event includes finding the start and end frames (i.e., time), and the play agent and the play-target of the event.

The term "classification" (also called categorisation) is the task of assigning an input to a certain group (also called class or category). The output of classification is the label of the group that the input has been assigned to. The assignment of an input to a class is generally based on certain characteristics of the input which are called features. When classes are formed based on some ontology, the classification provides semantic understanding.

In one example, the described arrangements are used to analyse and semantically label a video in an archive, for example in a video retrieval system. In another example, a live video feed is analysed and semantically labelled with a delay of a few seconds, or an alert is issued to an operator when an event of interest is observed in the video feed.

Figure 14A:
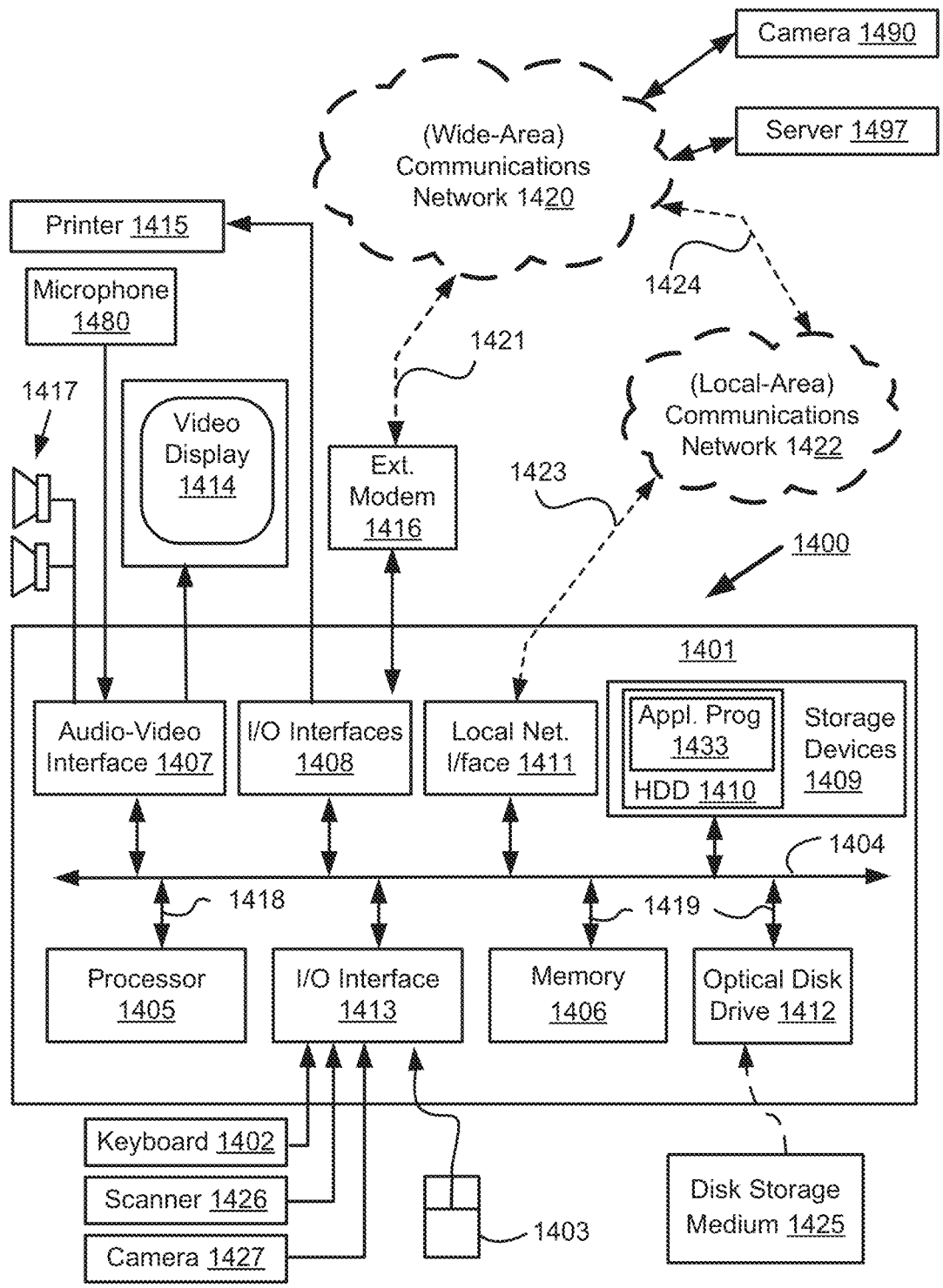

A composite frame representing an event summary is typically generated using a computing device. FIGS. 14A and 14B depict a general-purpose computer system 1400, upon which the various arrangements described can be practiced.

As seen in FIG. 14A, the computer system 1400 includes: a computer module 1401; input devices such as a keyboard 1402, a mouse pointer device 1403, a scanner 1426, a camera 1427, and a microphone 1480; and output devices including a printer 1415, a display device 1414 and loudspeakers 1417. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1416 may be a broadband modem. A wireless modem may also be used for wireless connection to the communications network 1420. Video data may be received in near real-time from one or more local image capture devices such as the camera 1427, or from one or more remote image capture devices via the network 1420, such as a remote camera 1490. Alternatively, the video data may be archived, for example stored in memory 1406, or from a remote device such as a server 1497.

The computer module 1401 typically includes at least one processor unit 1405, and a memory unit 1406. For example, the memory unit 1406 may have semiconductor random access memory (RAM) and semiconductor read only memory (ROM). The computer module 1401 also includes an number of input/output (I/O) interfaces including: an audio-video interface 1407 that couples to the video display 1414, loudspeakers 1417 and microphone 1480; an I/O interface 1413 that couples to the keyboard 1402, mouse 1403, scanner 1426, camera 1427 and optionally a joystick or other human interface device (not illustrated); and an interface 1408 for the external modem 1416 and printer 1415. In some implementations, the modem 1416 may be incorporated within the computer module 1401, for example within the interface 1408. The computer module 1401 also has a local network interface 1411, which permits coupling of the computer system 1400 via a connection 1423 to a local-area communications network 1422, known as a Local Area Network (LAN). As illustrated in FIG. 14A, the local communications network 1422 may also couple to the wide network 1420 via a connection 1424, which would typically include a so-called "firewall" device or device of similar functionality. The local network interface 1411 may comprise an Ethernet circuit card, a Bluetooth® wireless arrangement or an IEEE 802.11 wireless arrangement; however, numerous other types of interfaces may be practiced for the interface 1411.

The I/O interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1400.

The components 1405 to 1413 of the computer module 1401 typically communicate via an interconnected bus 1404 and in a manner that results in a conventional mode of operation of the computer system 1400 known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple Mac™ or like computer systems.

The method of generating a composite frame may be implemented using the computer system 1400 wherein the processes of FIGS. 1-6, 8, 10, 12-18 and 21, to be described, may be implemented as one or more software application programs 1433 executable within the computer system 1400. In particular, the steps of the method of generating a composite frame are effected by instructions 1431 (see FIG. 14B) in the software 1433 that are carried out within the computer system 1400. The software instructions 1431 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 1400 from the computer readable medium, and then executed by the computer system 1400. A computer readable medium having such software or computer program recorded on the computer readable medium is a computer program product. The use of the computer program product in the computer system 1400 preferably effects an advantageous apparatus for generating a composite frame.

The software 1433 is typically stored in the HDD 1410 or the memory 1406. The software is loaded into the computer system 1400 from a computer readable medium, and executed by the computer system 1400. Thus, for example, the software 1433 may be stored on an optically readable disk storage medium (e.g., CD-ROM) 1425 that is read by the optical disk drive 1412. A computer readable medium having such software or computer program recorded on it is a computer program product. The use of the computer program product in the computer system 1400 preferably effects an apparatus for generating a composite frame.

In some instances, the application programs 1433 may be supplied to the user encoded on one or more CD-ROMs 1425 and read via the corresponding drive 1412, or alternatively may be read by the user from the networks 1420 or 1422. Still further, the software can also be loaded into the computer system 1400 from other computer readable media. Computer readable storage media refers to any non-transitory tangible storage medium that provides recorded instructions and/or data to the computer system 1400 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more graphical user interfaces (GUIs) to be rendered or otherwise represented upon the display 1414. Through manipulation of typically the keyboard 1402 and the mouse 1403, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 1480.

FIG. 14B is a detailed schematic block diagram of the processor 1405 and a "memory" 1434. The memory 1434 represents a logical aggregation of all the memory modules (including the HDD 1409 and semiconductor memory 1406) that can be accessed by the computer module 1401 in FIG. 14A.

When the computer module 1401 is initially powered up, a power-on self-test (POST) program 1450 executes. The POST program 1450 is typically stored in a ROM 1449 of the semiconductor memory 1406 of FIG. 14A. A hardware device such as the ROM 1449 storing software is sometimes referred to as firmware. The POST program 1450 examines hardware within the computer module 1401 to ensure proper functioning and typically checks the processor 1405, the memory 1434 (1409, 1406), and a basic input-output systems software (BIOS) module 1451, also typically stored in the ROM 1449, for correct operation. Once the POST program 1450 has run successfully, the BIOS 1451 activates the hard disk drive 1410 of FIG. 14A. Activation of the hard disk drive 1410 causes a bootstrap loader program 1452 that is resident on the hard disk drive 1410 to execute via the processor 1405. This loads an operating system 1453 into the RAM memory 1406, upon which the operating system 1453 commences operation. The operating system 1453 is a system level application, executable by the processor 1405, to fulfil various high level functions, including processor management, memory management, device management, storage management, software application interface, and generic user interface.

The operating system 1453 manages the memory 1434 (1409, 1406) to ensure that each process or application running on the computer module 1401 has sufficient memory in which to execute without colliding with memory allocated to another process. Furthermore, the different types of memory available in the system 1400 of FIG. 14A must be used properly so that each process can run effectively. Accordingly, the aggregated memory 1434 is not intended to illustrate how particular segments of memory are allocated (unless otherwise stated), but rather to provide a general view of the memory accessible by the computer system 1400 and how such is used.

As shown in FIG. 14B, the processor 1405 includes a number of functional modules including a control unit 1439, an arithmetic logic unit (ALU) 1440, and a local or internal memory 1448, sometimes called a cache memory. The cache memory 1448 typically includes a number of storage registers 1444-1446 in a register section. One or more internal busses 1441 functionally interconnect these functional modules. The processor 1405 typically also has one or more interfaces 1442 for communicating with external devices via the system bus 1404, using a connection 1418. The memory 1434 is coupled to the bus 1404 using a connection 1419.

The application program 1433 includes a sequence of instructions 1431 that may include conditional branch and loop instructions. The program 1433 may also include data 1432 which is used in execution of the program 1433. The instructions 1431 and the data 1432 are stored in memory locations 1428, 1429, 1430 and 1435, 1436, 1437, respectively. Depending upon the relative size of the instructions 1431 and the memory locations 1428-1430, a particular instruction may be stored in a single memory location as depicted by the instruction shown in the memory location 1430. Alternately, an instruction may be segmented into a number of parts each of which is stored in a separate memory location, as depicted by the instruction segments shown in the memory locations 1428 and 1429.

In general, the processor 1405 is given a set of instructions which are executed therein. The processor 1405 waits for a subsequent input, to which the processor 1405 reacts to by executing another set of instructions. Each input may be provided from one or more of a number of sources, including data generated by one or more of the input devices 1402, 1403, data received from an external source across one of the networks 1420, 1402, data retrieved from one of the storage devices 1406, 1409 or data retrieved from a storage medium 1425 inserted into the corresponding reader 1412, all depicted in FIG. 14A. The execution of a set of the instructions may in some cases result in output of data. Execution may also involve storing data or variables to the memory 1434.

The described arrangements use input variables 1454, which are stored in the memory 1434 in corresponding memory locations 1455, 1456, 1457. The described arrangements produce output variables 1461, which are stored in the memory 1434 in corresponding memory locations 1462, 1463, 1464. Intermediate variables 1458 may be stored in memory locations 1459, 1460, 1466 and 1467.

Referring to the processor 1405 of FIG. 14B, the registers 1444, 1445, 1446, the arithmetic logic unit (ALU) 1440, and the control unit 1439 work together to perform sequences of micro-operations needed to perform "fetch, decode, and execute" cycles for every instruction in the instruction set making up the program 1433. Each fetch, decode, and execute cycle comprises:

a fetch operation, which fetches or reads an instruction 1431 from a memory location 1428, 1429, 1430;

a decode operation in which the control unit 1439 determines which instruction has been fetched; and an execute operation in which the control unit 1439 and/or the ALU 1440 execute the instruction.

Thereafter, a further fetch, decode, and execute cycle for the next instruction may be executed. Similarly, a store cycle may be performed by which the control unit 1439 stores or writes a value to a memory location 1432.

Each step or sub-process in the processes of FIGS. 1-6, 8, 10, 12-18 and 21 is associated with one or more segments of the program 1433 and is performed by the register section 1444, 1445, 1447, the ALU 1440, and the control unit 1439 in the processor 1405 working together to perform the fetch, decode, and execute cycles for every instruction in the instruction set for the noted segments of the program 1433.

The method of generating a composite frame may alternatively be implemented in dedicated hardware such as one or more integrated circuits performing the functions or sub functions of the method. Such dedicated hardware may include graphic processors, digital signal processors, or one or more microprocessors and associated memories.

FIG. 1 describes one arrangement of a method 100 of generating a composite frame summary. In the present disclosure, futsal is used as an example sport. However, the arrangements described are applicable to other similar sports (involving players and activity object), surveillance, traffic management of persons, cars and so on.

Futsal is a type of indoor soccer. A futsal game is played between two teams, where each team consists of 5 players, using a spherical ball slightly smaller than a regular soccer ball. In the arrangements described, the futsal ball is used as the activity object.

The method 100 is typically implemented as one or more modules of the application 1433, stored in the memory 1406, controlled under execution of the processor 1405.

The method 100 shown in FIG. 1 starts with receiving a video clip 105 and a pre-determined action event 101 as inputs. The video clip 105 in the current example is a futsal video clip. Examples of pre-determined action events relevant to futsal include actions such as successful-goal-shoot, unsuccessful-goal-shoot, successful-pass, and dribble events.

The pre-determined event input 101 is an instance (e.g. first or second) of a pre-determined action event. As an example, the pre-determined event input 101 is a first instance of a successful-goal-shoot event. An example representing instance of a pre-determined action event is via a tuple [N, C] where N represents the instance number and C represents the event type index. For example, N=1 and C=1 represents a first instance of a successful-goal-shoot event.

The method 100 executes a detecting step 110 once the video clip 105 and the pre-determined event 101 are received. Step 110 executes to detect or determine relevant frames of the sport video clip 105 for the pre-determined event. The detected frames correspond to occurrence of the predetermined event in the video clip 105. The step of determining action event relevant frames of the sport video clip is also referred to as action event detection. The relevant frames refer to detection of the pre-determined action event in the video. During the process of determining relevant frames, the step 110 also generates person tracking data, activity object tracking data, action moments and person roles. Step 110 is described in detail below using the flow chart presented in FIG. 2.

The method 100 progresses from step 110 to a determining step 115. Step 115 executes to determine an importance score for each person involved in the action event based on the output of step 110. Step 115 determines the importance score for each of the persons in the frames determined at step 110. In scenarios where multiple camera views are available, all persons from all views are considered. In the example of futsal, step 115 determines an importance score for each player involved in the action event based on the output of step 110. The importance score of a person signifies the importance of that person in the pre-determined action event. A method of calculating the importance score is described in detail in FIG. 15 in relation to a method 1500.

The method 100 continues from step 115 to a selecting step 120. Execution of step 120 selects a group of one or more persons from all persons in the determined frames based on the importance scores determined at step 115. In the example of futsal, step 120 selects a group of players from all players based on the importance scores determined at step 115. In one arrangement, a fixed importance score threshold is used to select a group of persons. In another arrangement, a pre-determined number of persons who have the highest importance scores are selected. For example, for a successful-goal-shoot, the application 1433 selects 3 players with the three highest importance scores. The importance score threshold and/or the pre-determined number of persons are typically determined through experimentation for a particular application (for example for futsal or volleyball).

The method 100 continues from step 120 to a generating step 130. Execution of step 130 generates a composite frame using person tracks, activity object tracks, the video clip 105, relevant frames, and selected group of persons. In the example of futsal, the step 130 generates or creates a composite frame using player tracks, ball tracks, video clip 105, relevant frames, and selected group of players. The composite frame is generated to represent a summary of the action event and includes the selected one or more persons for display. The step 130 is described in more detail by a method 1600 shown in FIG. 16. The composite frame can be displayed, for example using the display 1414, as part of step 130.

Figure 2:
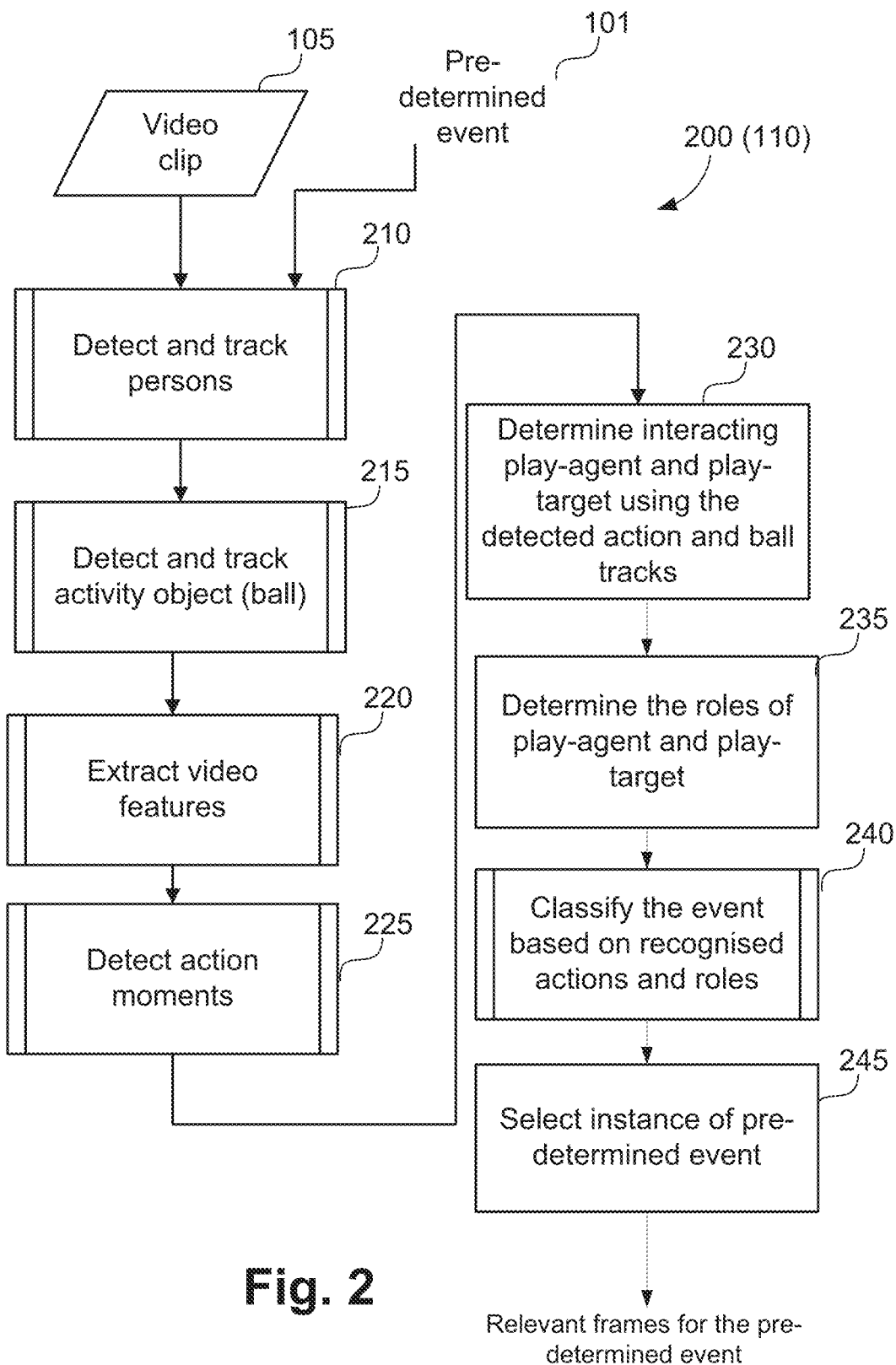
FIG. 2 shows a schematic flow diagram of determining relevant frames for the pre-determined input action event.

Step 110 of FIG. 1 is now described in more detail using a method 200 of detecting relevant frames shown in FIG. 2. The method 200 is typically implemented as one or more modules of the application 1433, stored in the memory 1406, controlled under execution of the processor 1405.

The inputs to the method 200 are the video clip 105 and the pre-determined event 101. The method 200 performs the detection of the instance of the pre-determined event 101 in the input video clip 105.

The event detection method 200 starts at person tracking step 210. A plurality of persons in the video sequence are identified and tracked at step 210. A method 300 of detecting and tracking persons, as executed at step 210, is described hereafter with reference to FIG. 3.

Figure 3:
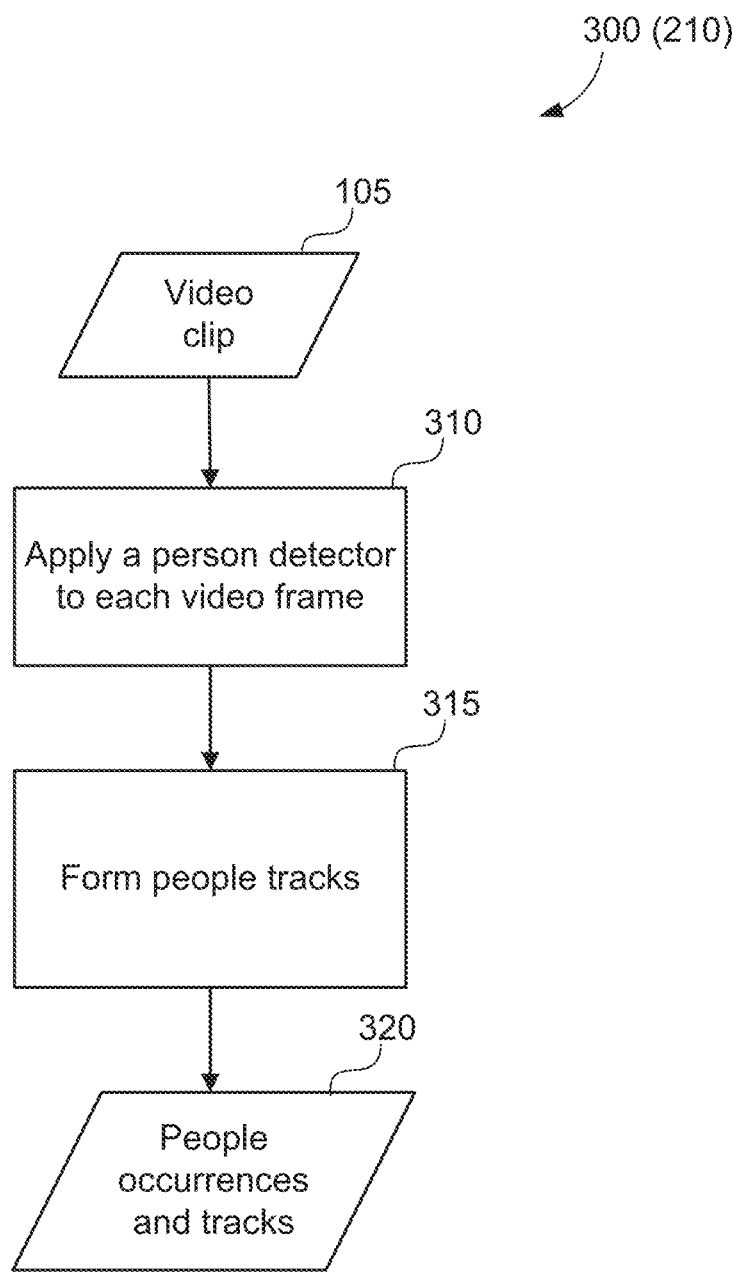
FIG. 3 shows a schematic flow diagram showing a method of detecting and tracking persons.

The method 300 of detecting and tracking persons (e.g. players), as executed at step 210 in FIG. 2, is now described in more detail in relation to FIG. 3. The method 300 is typically implemented as one or more modules of the application 1433, stored in the memory 1406, controlled under execution of the processor 1405.

The persons tracking method 300 accepts the video clip 105 as input and starts at an applying step 310. The application 1433 applies a person detector to each video frame at the person detection step 310. In one implementation, the person detector is trained by utilizing the Histograms of Oriented Gradients (HOG) descriptor and the Support Vector Machine (SVM) classifier, and the person detector is named referred to as a HOG people detector. The Histograms of Oriented Gradients descriptor represents an entire person by a single feature vector. The Histograms of Oriented Gradients people detector uses a sliding window detection approach for detecting the occurrence of people in each video frame. At each detection window, a Histograms of Oriented Gradients descriptor is determined. This descriptor is then shown to the trained Support Vector Machine classifier, which classifies the windows as either "person" or "not person". To detect people at different scales, each video frame is sub-sampled to produce multiple copies. The same Histograms of Oriented Gradients people detector can then be applied to each sub-sampled video frame. An alternative implementation may use an object detector using deep convolutional neural networks. Yet another implementation may use background subtraction followed by foreground blob connected component analysis and tracking.

The people tracking method 300 progresses from step 310 to a track forming step 315. In execution of step 315, the method 300 forms tracks of people detected at step 310. In one implementation, detected people at adjacent frames may be associated by comparing their appearance features. For example, a distance measure such as an L2 distance, histogram intersection distance, chi-square distance, etc. can be determined by comparing the Histograms of Oriented Gradients descriptors or colour histograms for people detected at frame $t_1$ and those detected at frame $t_2$. Two people are considered to be the same person if the distance measure of their appearance features is lower than an empirically determined threshold. A track can then be formed by connecting the centres of matched people through all frames. A track reveals the movement of a person. Other alternative tracking algorithms may be used in the track forming step 315 such as a Particle Filter tracking algorithm.

The track forming step 315 generates a set of people tracks 320 as output. In the set of tracks 320, each track is preferably associated with the occurrences of a person in all of the frames of the video clip 105. A track identifier is typically assigned to each generated track.

Referring to FIG. 2, the event detection method 200 progresses from people tracking step 210 to an activity object detection and tracking step 215. In execution of step 215, the activity object (for example a ball or puck) is detected and tracked through all video frames in the video clip 105. A method 400 of detecting and tracking activity objects, as executed at step 215, is described hereafter with reference to FIG. 4. While FIG. 4 and the associated descriptions use the word 'ball', ball can be replaced with an alternative activity object relevant to the target use-case.

Figure 4:
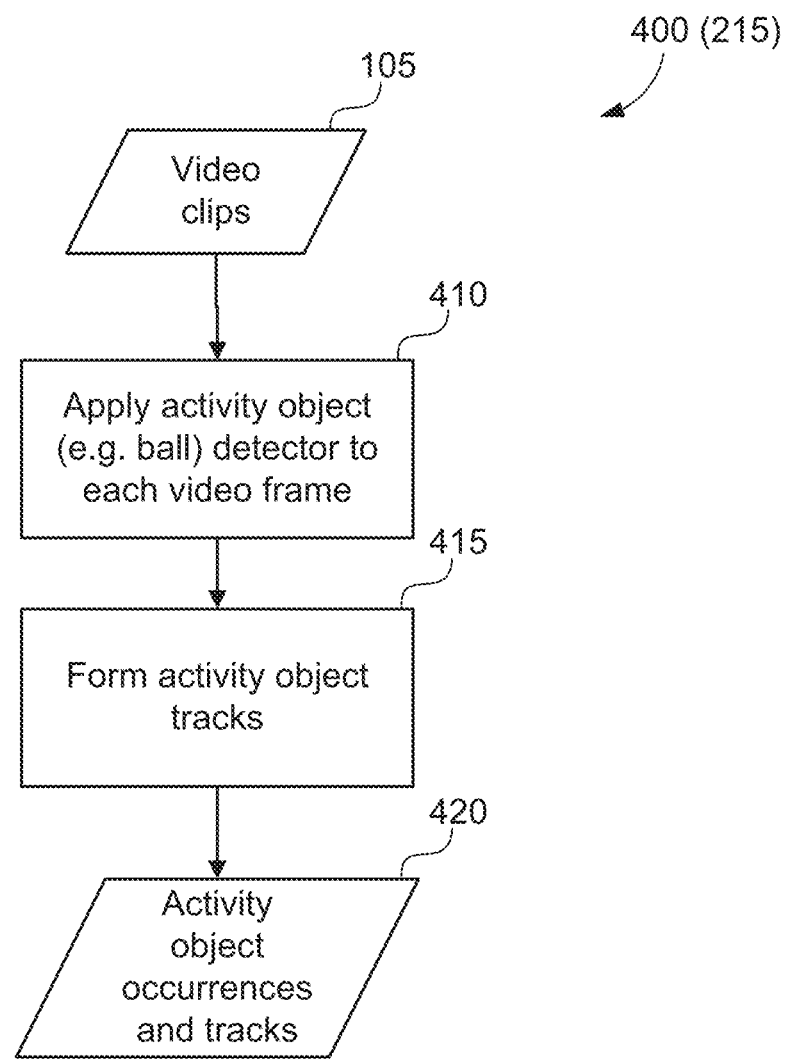
FIG. 4 shows a schematic flow diagram showing a method of detecting and tracking an activity object.

The method 400 of detecting and tracking ball (or an alternative activity object of interest), as executed at the ball detection and tracking step 215 in FIG. 2, is now described in more detail in relation to FIG. 4. The method 400 is typically implemented as one or more modules of the application 1433, stored in the memory 1406, controlled under execution of the processor 1405.

The ball tracking method 400 accepts the video clip 105 as input, and starts at an applying step 410. The application 1433 applies a ball detector to each video frame at step 410. In one implementation, a ball detector is trained by utilizing the Scale Invariance Feature Transform (SIFT) descriptor and the Support Vector Machine (SVM) classifier. The Scale Invariance Feature Transform descriptor captures the appearance feature of a ball. Similar to the people detector, the ball detector can detect the occurrence of the ball object by a sliding window approach. At each detection window, a Scale Invariance Feature Transform descriptor is computed. The Scale Invariance Feature Transform descriptor is then provided to the trained Support Vector Machine classifier, which classifies the windows as either "ball" or "not ball".

The method 400 executes to progress from step 410 to a forming step 415. In execution of step 415, the method 400 form tracks of the ball object based on the detection result at step 410. In one implementation, the Kalman filter may be applied to track the movement of the ball based on the detection results. Alternatively, other methods such as a particle filter based method may be applied to track the movement of the ball.

At the end of the execution at step 415, the method 400 returns an output 420 of occurrences of the ball object in all frames and the ball track.

Returning to FIG. 2, after detecting persons and activity object (in a futsal example, players and ball), the event detection method 200 progresses from step 215 to a feature extraction step 220. In execution of step 220, video features are extracted from the input video clip 105. The extracted features are used for estimating the actions of the plurality of people identified in step 210. A method of extracting video features, as executed at feature calculation step 220, is described hereafter with reference to FIG. 5.

Figure 5:
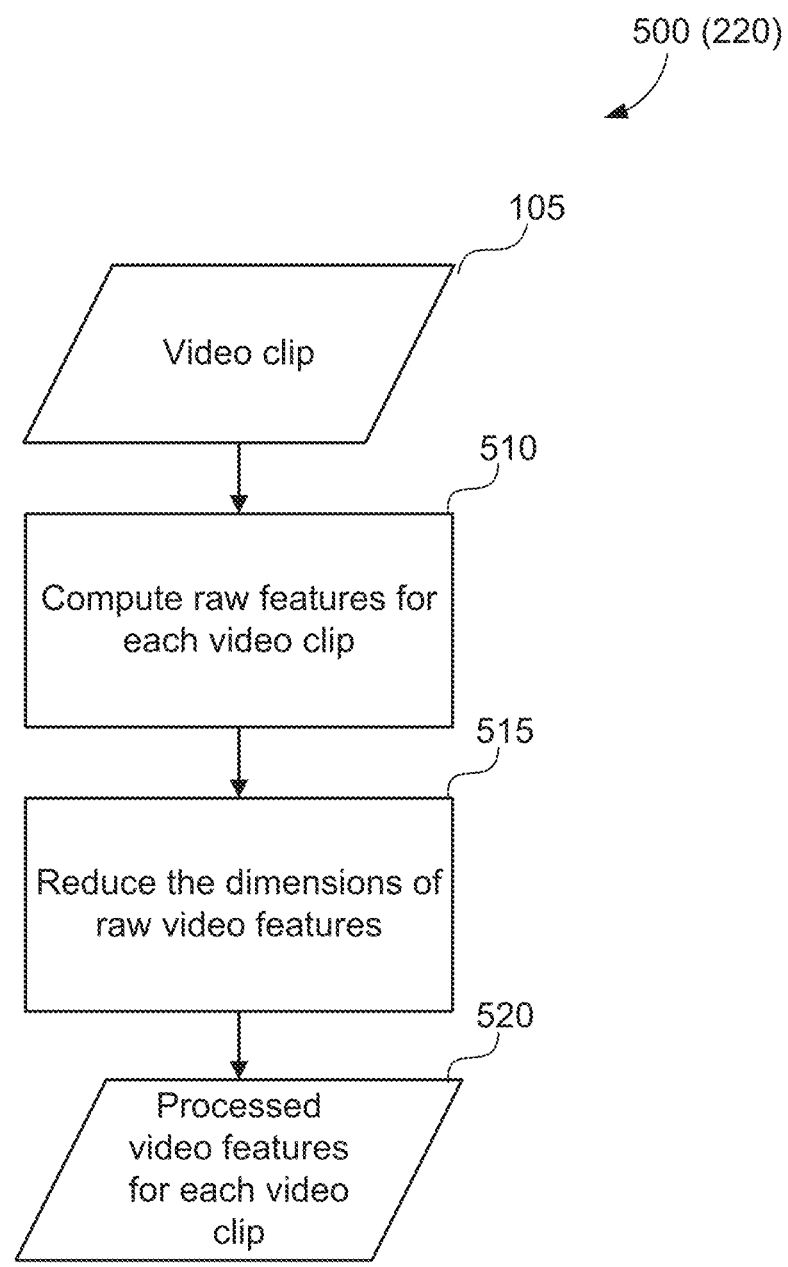
FIG. 5 shows a schematic flow diagram showing a method of determining video features.

FIG. 5 shows a method 500 of calculating action related features, as executed at the feature extraction step 220 in FIG. 2. The method 500 is typically implemented as one or more modules of the application 1433, stored in the memory 1406, controlled under execution of the processor 1405.

The input to the method 500 is the video clip 105. The method 500 starts at a feature calculation step 220. At the feature calculation step 510, the video clip 105 is loaded and the method 500 determines raw features for each video. A raw feature is a piece of information that describes certain characteristics of the video. In one implementation, Improved Dense Trajectory (iDT) features are chosen as the raw features. The Improved Dense Trajectory feature descriptor is a hand-crafted descriptor for action in videos. Trajectories are formed by tracking points using median filtering in a dense optical flow field. For each trajectory, multiple descriptors such as trajectory descriptor, Histogram of gradient (HOG), Histogram of optical flow (HOF), and Motion boundary histogram (MBH) descriptors are determined and concatenated to form the Improved Dense Trajectory feature descriptor. In particular, an Improved Dense Trajectory feature contains the properties shown in Table 2.

TABLE 2 iDT feature descriptor properties.

| Property name | Description |
| --- | --- |
| frameNum | The trajectory ends on which frame |
| mean_x | The mean value of the x coordinates of the trajectory |
| mean_y | The mean value of the y coordinates of the trajectory |

TABLE 2-continued iDT feature descriptor properties.

| Property name | Description |
| --- | --- |
| var_x | The variance of the x coordinates of the trajectory |
| var_y | The variance of the y coordinates of the trajectory |
| length | The length of the trajectory |
| scale | The trajectory is computed on which scale |
| x_pos | The normalized x position w.r.t. the video (0~0.999) |
| y_pos | The normalized y position w.r.t. the video (0~0.999) |
| t_pos | The normalized t position w.r.t. the video (0~0.999) |
| Trajectory | 2x[trajectory length] (default 30) |
| HOG | 8x[spatial cells]x[spatial cells]x[temporal cells] (default 96) |
| HOF | 9x[spatial cells]x[spatial cells]x[temporal cells] (default 108) |
| MBHx | 8x[spatial cells]x[spatial cells]x[temporal cells] (default 96) |
| MBHy | 8x[spatial cells]x[spatial cells]x[temporal cells] (default 96) |

An alternative implementation may use features extracted using a convolutional neural network trained for detecting actions of interest.

In one implementation, the feature calculation method 500 progresses from the step 510 to a dimension reduction step 515. In execution of the step 515, the dimensions of the raw video features are reduced. In one implementation, the dimension reduction is conducted by Principal Component Analysis (PCA). Principal Component Analysis is a statistical procedure that uses an orthogonal transformation to convert a set of observations of possibly correlated variables into a set of values of linearly uncorrelated variables named principal components. The dimension reduction step 515 is an optional step which can be used to reduce computational cost of action detection. However, when the features calculated in feature calculation step 510 are high dimensional (such as Improved Dense Trajectory features) using dimension reduction step 515 is recommended. When dimension reduction is conducted using a decorrelating method such as Principal Component Analysis, the recognition accuracy may also improve due to the decorrelating effect of Principal Component Analysis transform. In some implementations, the step 515 is omitted.

The feature calculation method 500 returns a set of processed video features 520 for the video clip 105.

Returning to FIG. 2, once the video features are extracted in feature calculation step 220, the event detection method 200 executes to an action detection step 225. In execution of step 225, action moments associated with the plurality of people identified at people tracking step 200 are detected and classified. Detecting and classifying the action moments involves training action moment classifiers and providing the extracted video features to the trained action moment classifiers. In particular, the classifiers are trained based on the extracted video features for different action moment classes. An example of different action moment classes for futsal is—leg-kick, head-hit, leg-receive, and hand-receive.

Figure 6:
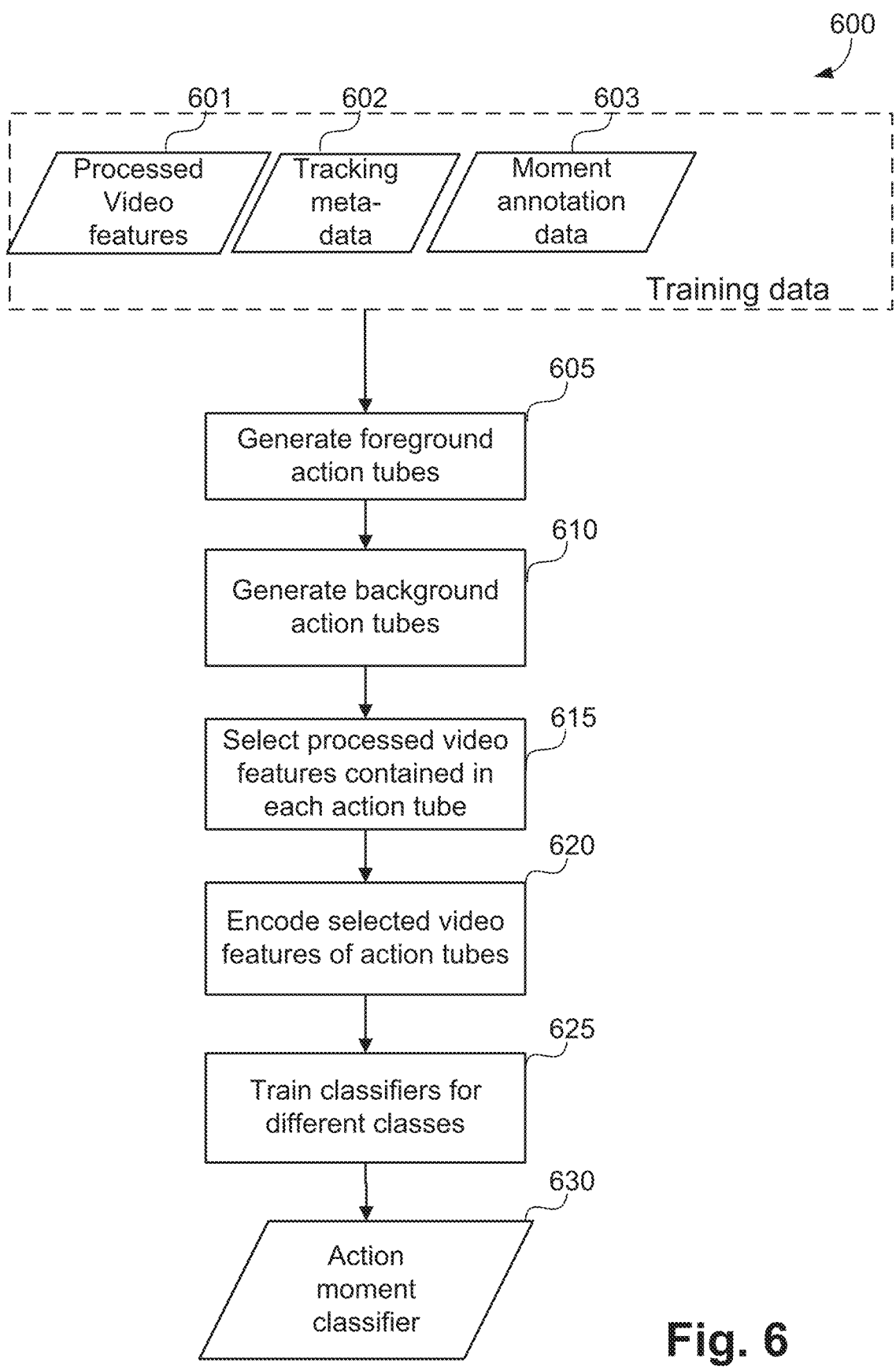
FIG. 6 shows a schematic flow diagram showing a method of training action moment classifiers.
Figure 7:
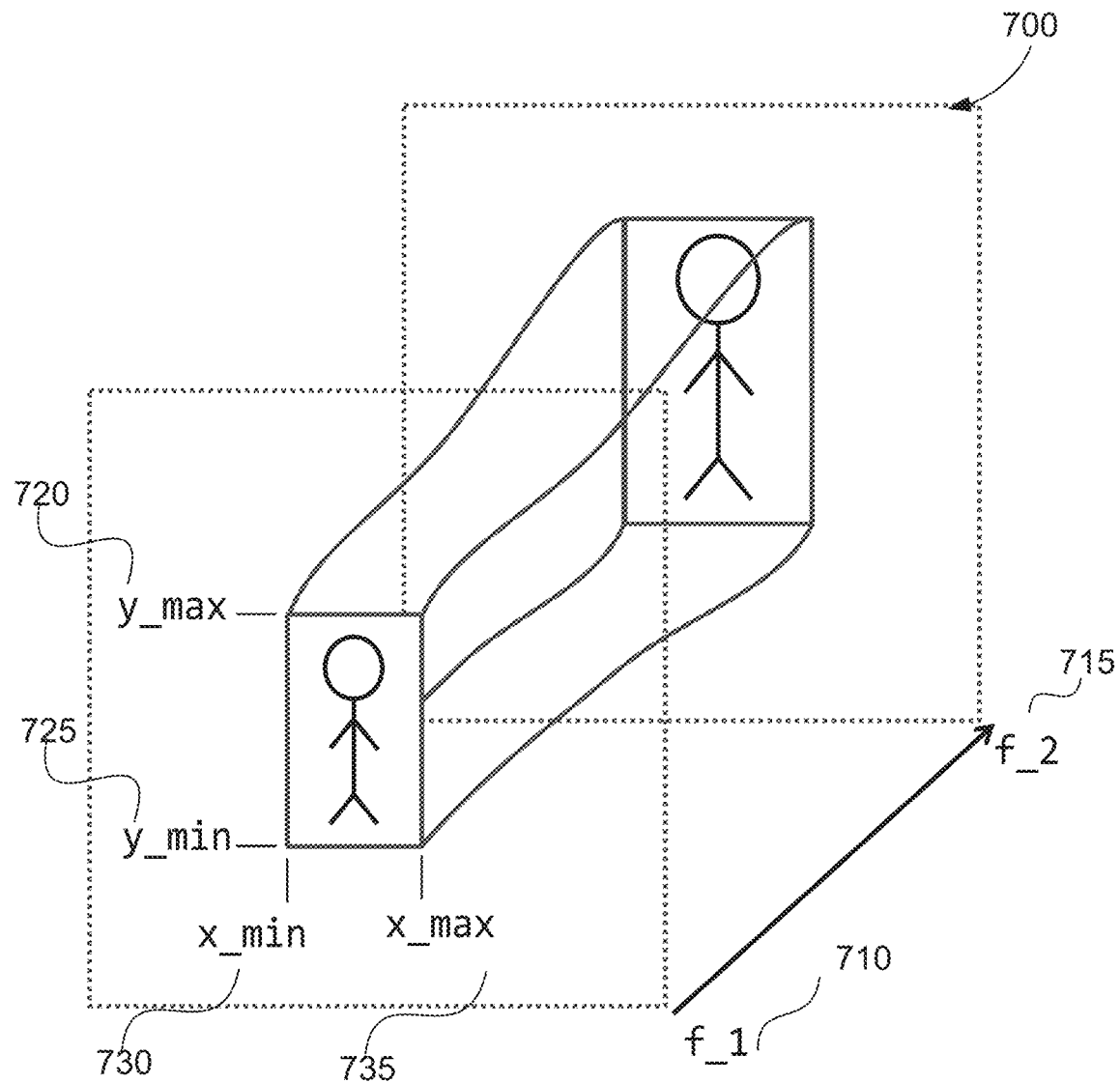
FIG. 7 shows a visualisation of an action tube.
Figure 8:
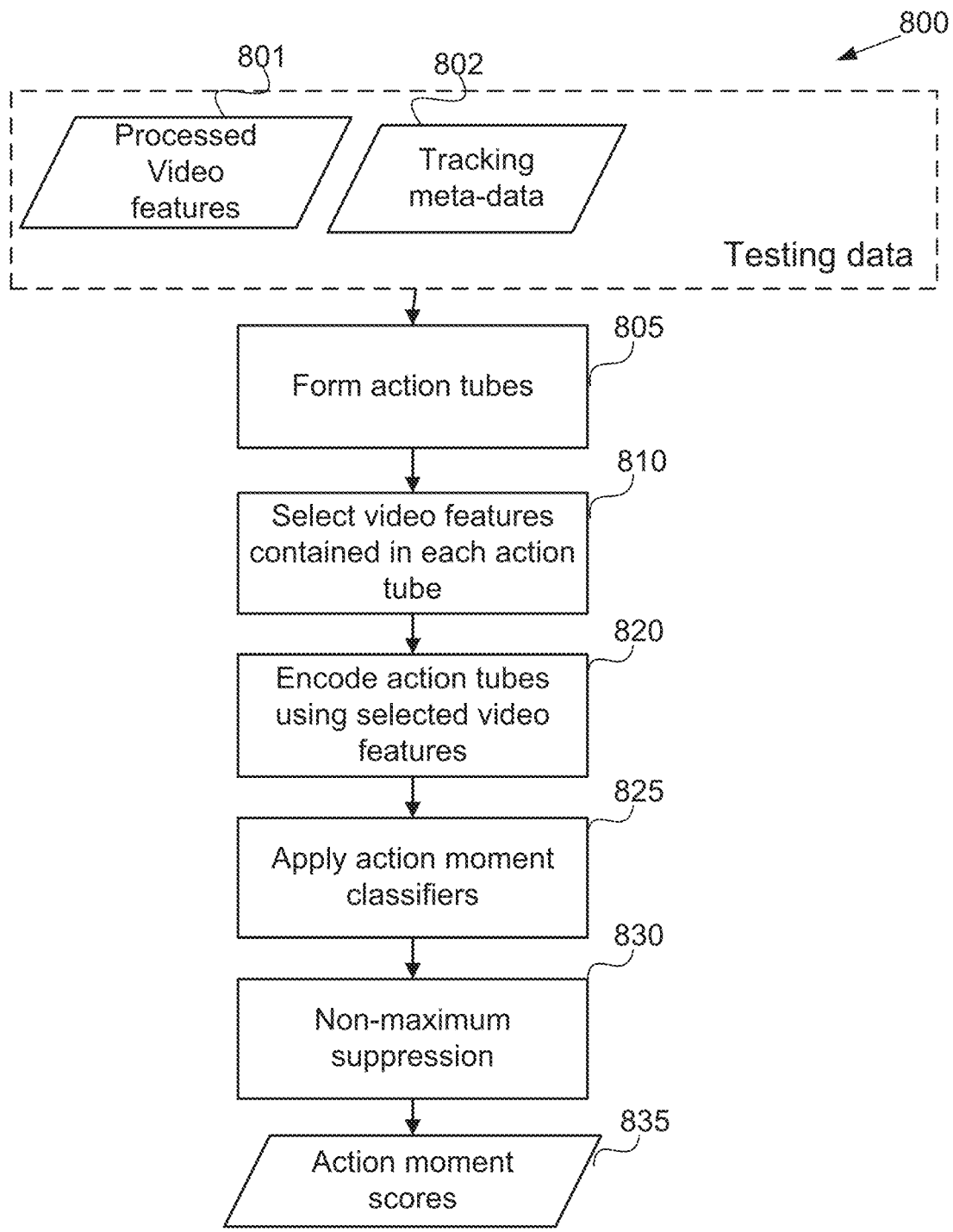
FIG. 8 shows a schematic flow diagram showing a method of detecting and classifying action moments.

A method of training action moment classifiers, as associated with action detection step 225, is described hereafter with reference to FIGS. 6 and 7. FIG. 8 describes a method of applying a trained classifier to detect action moments.

A method 600 of training a classifier to detect action moments, as executed at action detection step 225 in FIG. 2, is now described in more detail in FIG. 6. The term action moments refer to moments (for example the frames) in which a particular action occurs.

In one arrangement, action moment detection is achieved by applying trained action moment classifiers to extracted video features 520 and tracking data 602 for persons (e.g. players) and activity objects (for example a ball). The method 600 of training action moment classifiers, as used in step 225, is depicted in FIG. 6.

The input to the method 600 consists of processed video features 601 computed using the feature calculation method 500 described with respect to FIG. 5 for the video sequences in a training set 600, tracking metadata 602 (including both people and activity object tracking data) and moment annotation data 603 for the video sequences in the training set 600. At training, the tracking metadata 602 can be generated by tracking people using the people tracking method 300 as is used in people tracking step 310, or provided as part of the training data, for example by manually tracking people using a software tool. Similar to the people tracking data, activity object tracking data can be generated by using the activity tracking method 400, or provided as part of the training data, for example by manually tracking activity object using a software tool. The moment annotation data 603 may contain the starting frame, ending frame, people identifiers (for example in the form of associated track identifier), and action moment label for each action moment. The moment annotation data is typically prepared manually, or from output of a previously trained classifier.

The action moment classifier training method 600 starts with a foreground action tube forming step 605. In execution of step 605, foreground action tubes are generated using the moment annotation data 603.

A foreground action tube contains an instance of an action of interest, and is specified by a frame range. In the example of FIG. 7, a frame range 700 includes a starting frame 710, and an ending frame 715, each of the frames including the same person. The frame range 700 also includes a spatial extent for each frame inside the tube. The spatial extent is given by a bounding box specified by a top-left corner [730, 720], and a bottom-right [735,725] corner over the frame range 700. For every annotated moment that maps to an action moment label, an action tube is created with a predefined number of frames, for example 25 frames.

The action moment classifier training method 600 continues from step 605 to a background action tube forming step 610. In step 610, background action tubes are generated using the moment annotation data 603. A background action tube contains no action of interest. In one arrangement background action tubes are generated by randomly selecting an action tube which does not temporally overlap with any of the foreground action tubes generated in foreground action tube forming step 605.

Next, the action moment classifier training method 600 progresses from step 610 to a feature selection step 615. In execution of step 615, for each action tube produced at the foreground action tube forming step 605 and the background action tube forming step 610, the subset of processed video features 601 contained in the determined action tube are selected for the purpose of describing the action tube. In step 615, each processed video feature (for example each calculated Improved Dense Trajectory feature vector) is assigned either to a corresponding action tube with a temporal and spatial match or is discarded if no matching action tube is found. Matching can be done based on the ending frame number of the Improved Dense Trajectory feature and the frame number range of the action tube as well as the mean x and y position of the Improved Dense Trajectory feature.

The action moment classifier training method 600 executes from step 615 to a feature encoding step 620. In execution of step 620, each action tube is now associated with a variable number of Improved Dense Trajectory features contained within the action tube. Feature encoding step 620 forms a single encoding vector for each action tube from the statistics of the associated video features. Fisher vector encoding may be employed to encode the features, so that each action tube is encoded by a Fisher vector.

Once all action tubes have been encoded at step 620, each action tube is described by a single encoding vector which encodes all associated video features. The method 600 executes from step 620 to a classifier training step 625. In execution of step 625, action moment classifiers are trained to classify actions contained in the spatio-temporal action tubes based on their encoding vectors. A multi-class linear Support Vector Machine may be employed with the Fisher-vectors that have been encoded for each action tube at step 620 action moment classifier training and a corresponding label for the action contained in the action tube. At training time, each action tube (either foreground or background) m (m∈[0, . . . , $N_{AT}$]) ($N_{AT}$ stands for the total number of action tubes) in the training set has a single Fisher vector $F_m$, and a corresponding target action class $y_m$. In one implementation, the classifier is trained using one-versus-rest (OVR) multi-class classification, where $N_C$ ($N_C$ is the number of binary classifiers) binary classifiers are trained to discriminate each class separately against all other classes. An alternative implementation may use pair-wise multi-class Support Vector Machine classifiers, or multinomial logistic regression (also known as softmax) classifiers. At the end of the action moment classifier training method 600, the multi-class classifier trained in the classifier training step 625 returns an action moment classifier 630.

After the action moments are detected, the action moments are localized temporally in the form of action tubes, which are shown in FIG. 7. Each action tube specifies the starting frame 715 and ending frame 710 of the corresponding action moment.

A method 800 of detecting and classifying action moments, as executed at action detection step 225, is described hereafter with reference to FIG. 8.

The action moment detection method 800 of applying action moment classifiers, as executed in step 225, is depicted in FIG. 8. The method 800 is typically implemented as one or more modules of the application 1433, stored in the memory 1406, controlled under execution of the processor 1405. Rather than training, the method 800 uses a trained classifier (for example trained using the method 600) to detect and classify action moments.

The input to the action moment detection method 800 consists of processed video features 801 determined at feature calculation step 220, tracking metadata 802 determined at people tracking step 210 and ball (or other activity object) tracking step 215.

The action moment detection method 800 starts with an action tube forming step 805. In execution of step 805, a set of action tubes are densely sampled from the range of the testing video. For testing videos with multiple views, videos from every view are sampled to produce action tubes from each view.

The method 800 continues from step 805 to a feature encoding step 810. Feature encoding step 810 selects the processed video features 801 associated with each selected action tube using a similar method to that employed in step 615 in FIG. 6. The method 800 continues from step 810 to a feature encoding step 820. At the feature encoding step 820, the selected video features for each action tube are encoded as a single feature vector using a similar method as in step 620 of FIG. 6. The method 800 progresses from step 820 to an action moment classification step 825. At the action moment classification step 825 the trained action classifiers from step 625 at FIG. 6 are applied to each action tube to obtain the action classification scores.

Upon completion of step 825 the action classification scores are available for all action tubes and the method 800 progresses to an applying step 830. In order to determine the temporal location (localise) of the actions, non-maximum suppression is applied at step 830. For videos with multiple views, the action moment classification scores for the multiple views are consolidated into a single classification score for each action tube. Methods for consolidating the scores from multiple views include, but are not limited to, averaging scores from all views and taking the maximum score of all views. The non-maximum suppression method of step 830 is a locally greedy algorithm which localises the actions of interest by greedily selecting action tubes with the maximum score in a local spatio-temporal neighbourhood and suppressing the selection of other action tubes within this local spatio-temporal neighbourhood. In one embodiment, for a given action moment, a preferred view is selected from multiple camera views based on the action moment classification scores. For example, the view which has the maximum classification score for the action moment, is selected as the preferred view for the selected action.

Figure 9:
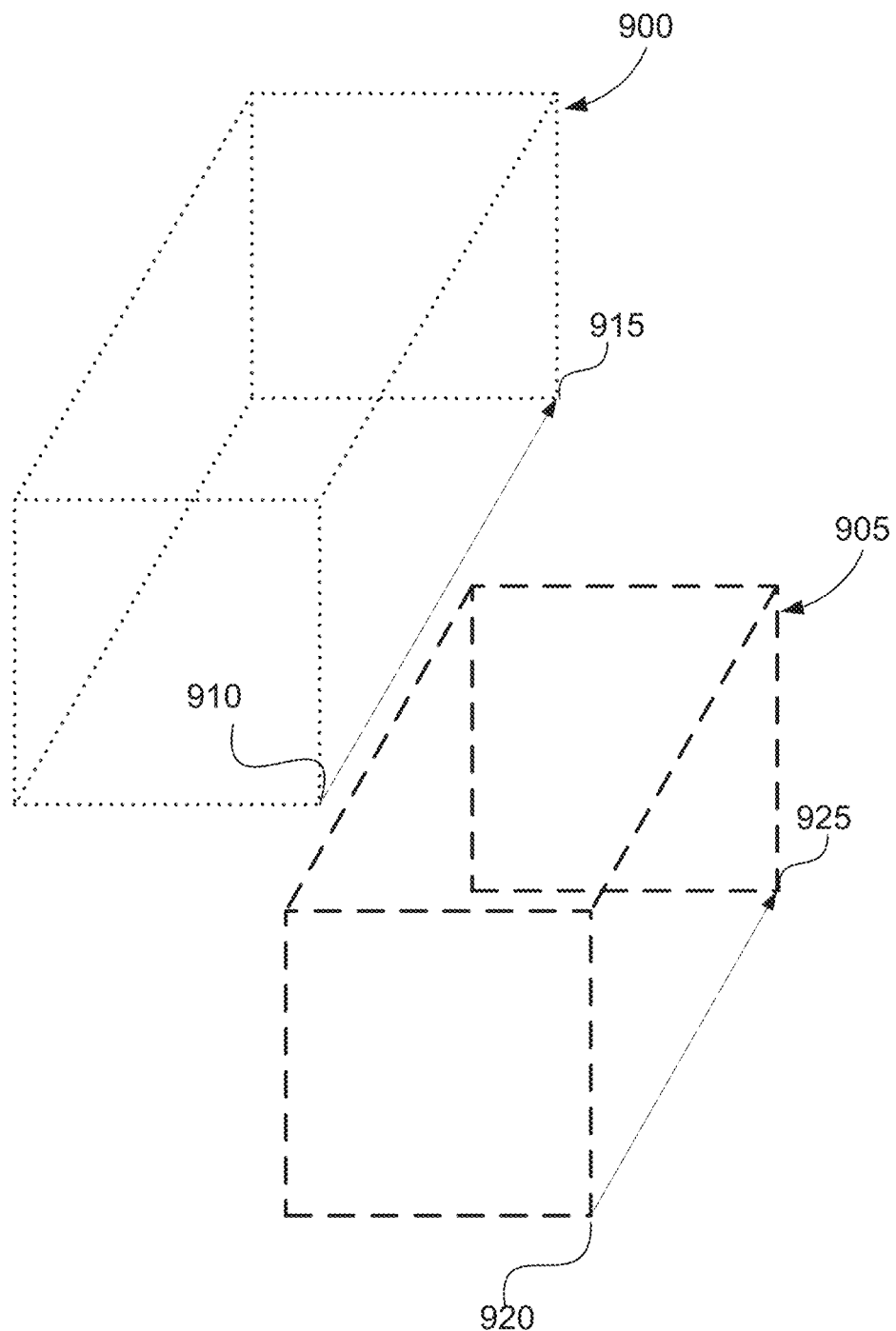
FIG. 9 shows two example action tubes.

The local spatio-temporal neighbourhood can be defined using measures such as a temporal overlap (i.e., temporal intersection over union), a fixed temporal window, or spatio-temporal intersection over union. For example, FIG. 9 depicts two adjacent action tubes, 900 and 905. The action tube 900 has a temporal duration defined by the start frame 910 and end frame 915. Similarly, the action tube 905 is defined by frames 920 and 925 temporally. The action tubes 900 and 905 have temporal overlaps. The temporal union of the action tubes 900 and 905 is defined by an interval starting at frame min(910, 920), and ends at frame max(915, 925), where min(.,.) returns the minimum of given two frames and max(.,.) returns the maximum of given two frames. The temporal intersection of the tubes 900 and 905 is defined by the interval starting at max(910, 920), and ending at frame min(915, 925). Often a fixed overlap temporal window of half-width T is used in the non-maximum suppression step 830 and score with time within T of a selected local maximum is suppressed.

Step 835 outputs action moment score 835, effectively identifying action moments.

Returning to FIG. 2, the event detection method 200 executes from step 225 to an event localisation step 230. In execution of step 230, events are formed as per the determined localized action moments to determine interacting play-agents and play-targets. In one implementation all the action moments are sorted temporally as per their starting frames. Action events are formed by grouping temporally adjacent action moments. For each formed action event, the person whose action moment happens first is referred to as the play-agent, whereas the person whose action moment occurs later is referred to as the play-target. In some events, no person is involved as the play-target. For example, in a successful-goal-shoot action event, there is no play-target involved. In cases without a play-target, a play-target value is initialised to a pre-determined value such as −1.

Once the play-agents and play-targets are determined at event localisation step 230, the event detection method 200 executes to a role determination step 235. In execution of the step 235, roles of play-agents and play-targets are determined. In one implementation the roles are determined by applying classifiers trained on appearance features. For example, in sport games different teams often wear uniform with different colours and logos. Players with special roles, such as goal-keepers in futsal or Libero in volleyball often wear a jersey of a different appearance. Appearance features such as colour histogram, histogram of gradients, and scale invariant feature transform (SIFT) feature can be extracted to train classifiers for different teams. In another implementation the roles are estimated by applying classifiers trained on movement statistics. For instance, in soccer games, the movement of the goal keepers are often limited within a vicinity of the goal area. In this example, movement statistics such as the mean values and the standard deviation values can be used to train classifiers that detect goal keepers.

The event detection method 200 proceeds from step 235 to an event classification step 240. In execution of step 240, events are classified based on the actions and roles of play-agents and play-targets determined in event localisation steps 230 and 235. The classification relates to the type of interaction. The type of interaction is based on at least one of a predetermined event, a distance between the activity object and the plurality of persons, and a role of the plurality of persons. The actions are recognised in action detection step 225, and the roles are determined in role determination step 235. For example, when analysing the videos of soccer games, to detect the shoot events that are controlled by the goal-keeper of the opposite team, the action of play-agent (e.g., kick) and the role of play-target (e.g., goal keeper of the opposite team) would be used. For another type of event such as successful Pass, the action of play-agent (e.g., kick) and the role of both play-agent and play-target (e.g., a player of home team) is important. For another type of event such as successful-goal-shoot, the action of play-agent (e.g., kick) and the final position of the ball on the field (detected using ball tracking method) is important. A method of classifying an event using probabilistic graphical model is described hereafter with reference to FIGS. 10, 11, 12 and 13 collectively.

Figure 10:
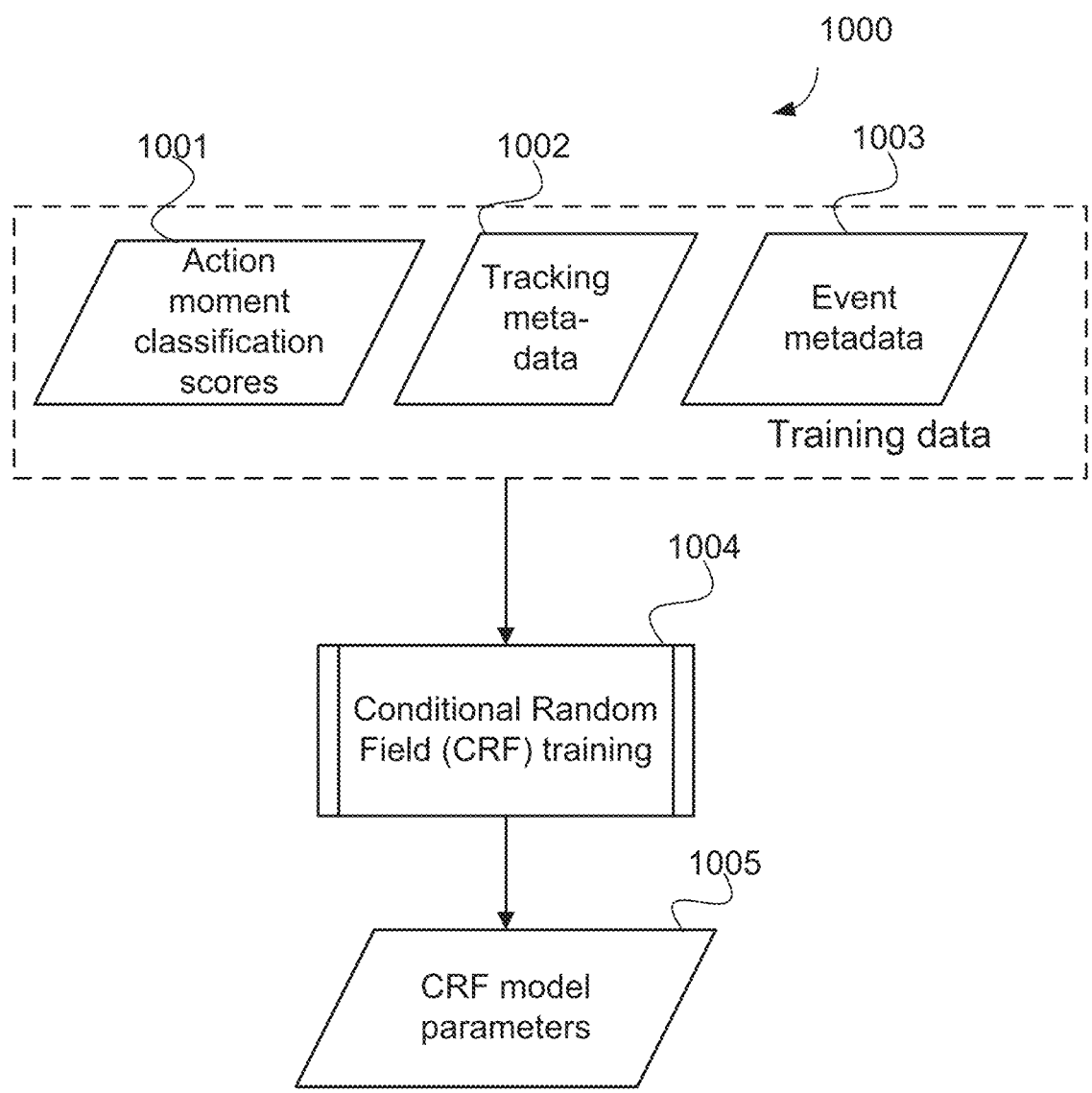
FIG. 10 shows a data flow diagram showing a method of training a conditional random field model.
Figure 11:
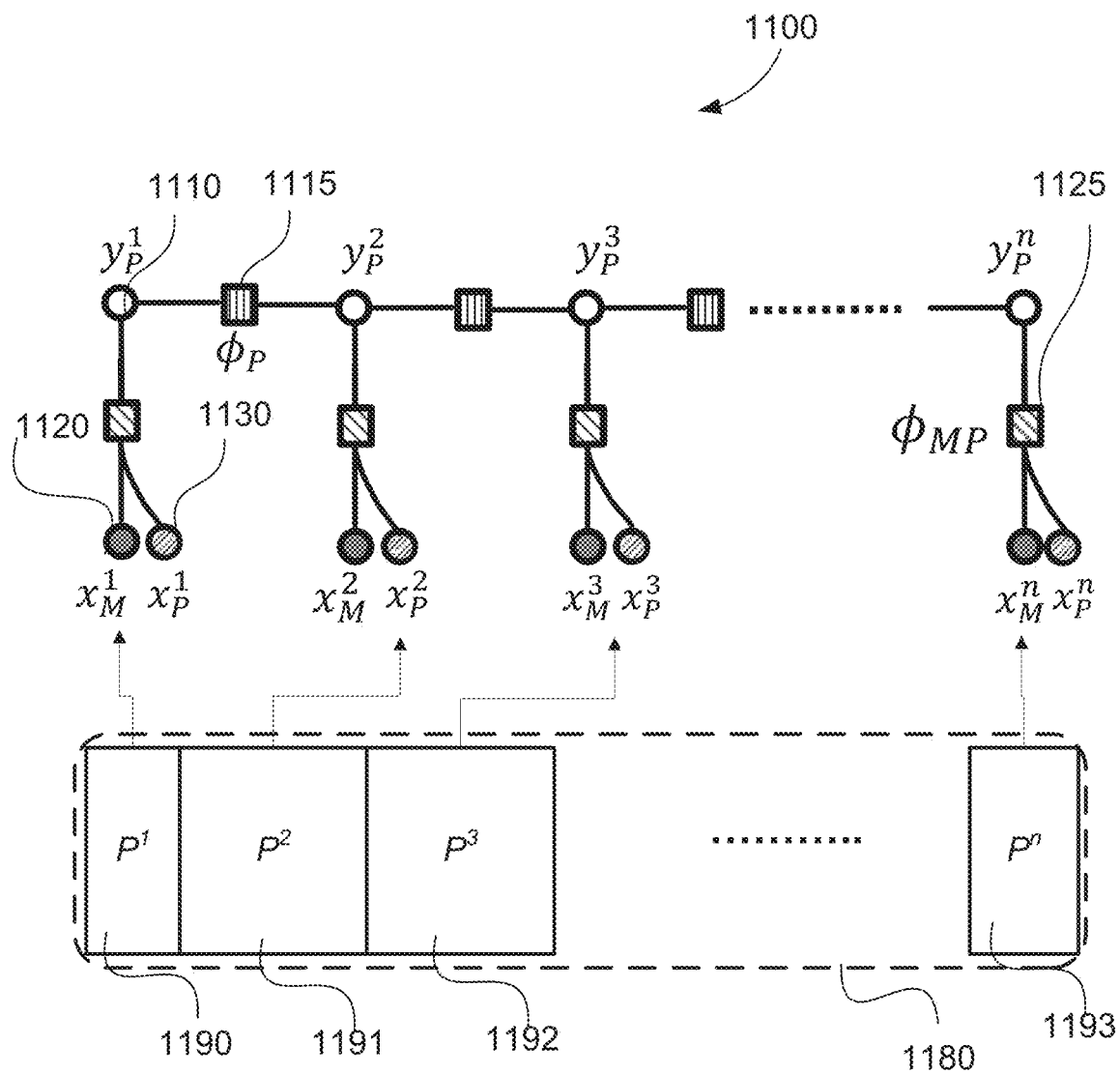
FIG. 11 shows a visualisation of an example graphical model for jointly classifying events with action moment scores and role information.
Figure 12:
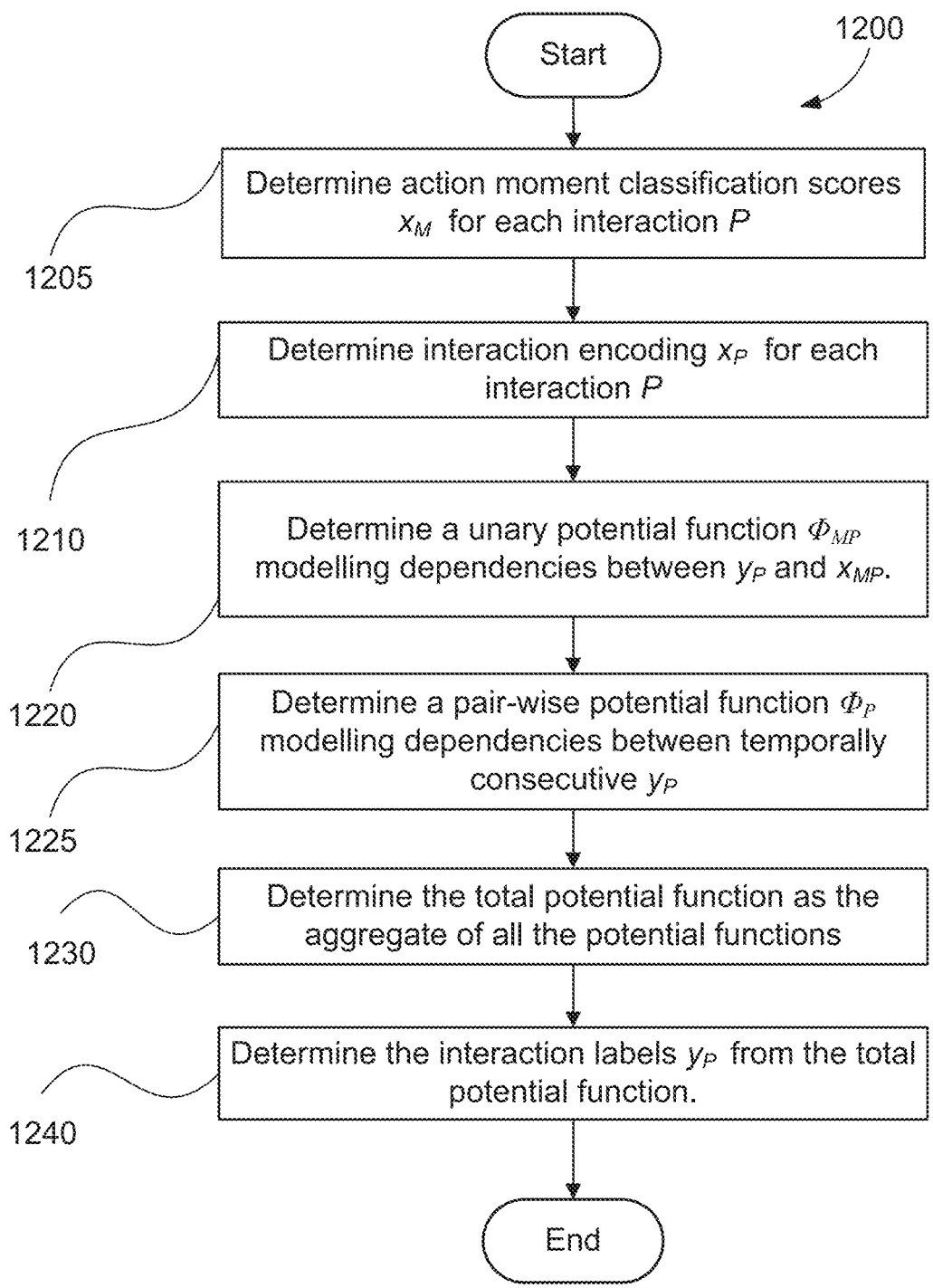
FIG. 12 shows a schematic flow diagram showing a method of classifying an event based on action scores and recognised roles.

A method of classifying the event based on recognised actions and roles, as executed at event classification step 240 in FIG. 2, is described in more detail in relation to FIG. 10, FIG. 11, and FIG. 12 collectively.

FIG. 10 shows a method 1000 of training a conditional random field (CRF) model for classifying events. The method 1000 is typically implemented as one or more modules of the application 1433, stored in the memory 1406, controlled under execution of the processor 1405.

The training data for the conditional random field model consists of action moment classification scores 1001 obtained as output from the action moment classification step 825 in FIG. 8, tracking metadata 1002, and event metadata 1003. The tracking metadata 1002 is obtained from the execution of people and activity object tracking methods 300 and 400 respectively. The event metadata 1003 contains ground truth labels for each event in the video, and also contains the information about the corresponding action moments for each event. In one arrangement, action moment classification scores are determined for action moments defined by ground truth from the training set. In particular, the temporal information (start and end frames) for each action moment is obtained from the ground truth. In an alternative arrangement, action moment classification scores are determined on action moments obtained by applying the method 800 on the training video set. In this manner, the temporal information for each action moment from the training set is derived by the method 800. A set of conditional random field model parameters is 1005 obtained from execution of a step of Conditional random field learning 1004. A method of conditional random field model training, as executed at conditional random field training step 1004, is described hereafter with reference to FIG. 11.

FIG. 11 shows a visualisation of a chain-structured conditional random field model 1100 for classifying events with action moment scores and role information, as trained using the method 1000 and used in the event detection using as described hereafter in relation to FIG. 12. In the visualization of the conditional random field model 1100 shown in FIG. 11, empty circles such as 1110 indicate output variables, and filled circles such as a circle 1120 represent input variables. Filled squares such as 1115, 1125 represent potential functions for which the parameters are learned using the training data. A potential function in a conditional random field stands for a function of a subset of all input variables. The training data represents a sequence of events which contains events $P^1$ 1190, $P^2$ 1191, $P^3$ 1192, ..., $P^n$ 1193. Each event contains both the starting and ending action moments.

The depicted conditional random field models the conditional distribution between the classes of action moment and event as per Equation (1):

$$P(Y|X) = \frac{1}{Z(X)} \exp(-E(Y, X; W)) \quad (1)$$

In Equation (1), $$E(y,x;w) = E(y_p^1, y_p^2, y_p^3, \ldots, y_p^n, x_{MP}^1, x_{MP}^2, x_{MP}^3, \ldots, x_{MP}^n; w) = \sum_{i=1}^{n} \phi_{MP}(y_p^i, x_{MP}^i, w_{MP}) + \sum_{i=1}^{n-1} \phi_P(y_p^i, y_p^{i+1}; w_P) \quad (2)$$

In Equation (2):
n is the number of events;
$Y = (Y_p^1, Y_p^2, Y_p^3, \ldots, Y_p^n)$ represents the output variables in the conditional random field model;
$Y = (y_p^1, y_p^2, y_p^3, \ldots, y_p^n)$ is a value of Y, and y∈Y. Each $y_p^i$ (for example the output 1110) represents an event label from a finite state set S;
$X = (X_{MP}^1, X_{MP}^2, X_{MP}^3, \ldots, X_{MP}^n)$ represents the input variables in the conditional random field model;
$x = (x_{MP}^1, x_{MP}^2, x_{MP}^3, \ldots, x_{MP}^n)$ is a value of X, and x∈X. Each $x_{MP}^i$ is a concatenation of $x_M^i$ and $x_P^i$, i.e., $x_{MP}^i = [x_M^i, x_P^i]$. In particular, $x_M^i$ 1120 is an event feature which is obtained by concatenating the moment classification scores 830 from both action moments of an event, and
$x_P^i$ 1130 is an input vector which encodes the following information for the corresponding event:
  Whether the play-agent's track identifier is the same as that of the play-target: 1 if the identifiers are the same and 0 otherwise.
  Whether the play-agent's team identifier is the same as that of the play-target: 1 if the identifiers are the same and 0 otherwise.
  The ball position at both the starting and ending moments: 1 if the ball is in goal area and 0 otherwise.
$\phi_{MP}(y_P, x_{MP}; w_{MP})$ 1125 is the unary potential function which models the dependencies between an event label $y_P$ and the event feature $x_{MP}$. $w_{MP}$ is the model parameter of the unary potential function.
$\phi_P(y_P, y'_P; w_P)$ 1115 is a pairwise potential function which models the dependencies (for example, statistical correlation) between event label $y_P$ and $y'_P$. $w_P$ is the model parameter of the pairwise potential function.

Given a training set $\{(x^i, y^i)\}_{i=1}^m (x^i \in X, y^i \in Y)$, with m training examples, the model parameters $[w_{MP}, w_P]$ for the conditional random field model may be found in the max-margin framework for solving structural support vector machine.

FIG. 12 is a schematic flow diagram showing a method 1200 of classifying the event based on recognised actions and roles using the trained conditional random field model 1005 generated in FIG. 10, and using the model and equations described in relation to FIG. 11. The method 1200 is typically implemented as one or more modules of the application 1433, stored in the memory 1406, controlled under execution of the processor 1405.

The method 1200 starts at an action moment classification step 1205. For each event P, the method 1200 determines an associated action moment classification score $x_M$ using the trained model generated at FIG. 10 in execution of the action moment classification step 1205. The method 1200 progresses from step 1205 to an event encoding step 1210. For each event P, an event encoding $x_P$ is determined for the associated action moment classification score $x_M$ at step 1210.

The method 1210 progresses from step 1210 to a unary potential function determination step 1220. Using $x_M$, $x_P$, and model parameters $[w_{MP}, w_P]$, the method 1200 determines a unary potential function $\phi_{MP}$ and a pairwise potential function $\phi_P$ in execution of unary potential function determination step 1220. The method 1200 continues from step 1220 to a pairwise potential function determine step 1225. Execution of the step 1225 determines a pairwise potential function $\phi_P$ for the unary potential function $\phi_{MP}$.

The method 1200 continues from step 1225 to an aggregate determining step 1230. The total potential function is determined as the aggregate of all potential function at step 1230. The method 1200 continues from step 1230 to a label determining step 1240. The label $y_P$ for the event is determined as the label that maximises the total potential function in step 1240. Determining the label that maximises the total potential function can be achieved by applying Bayesian belief propagation algorithms on the graphical model depicted in FIG. 11.

Figure 13:
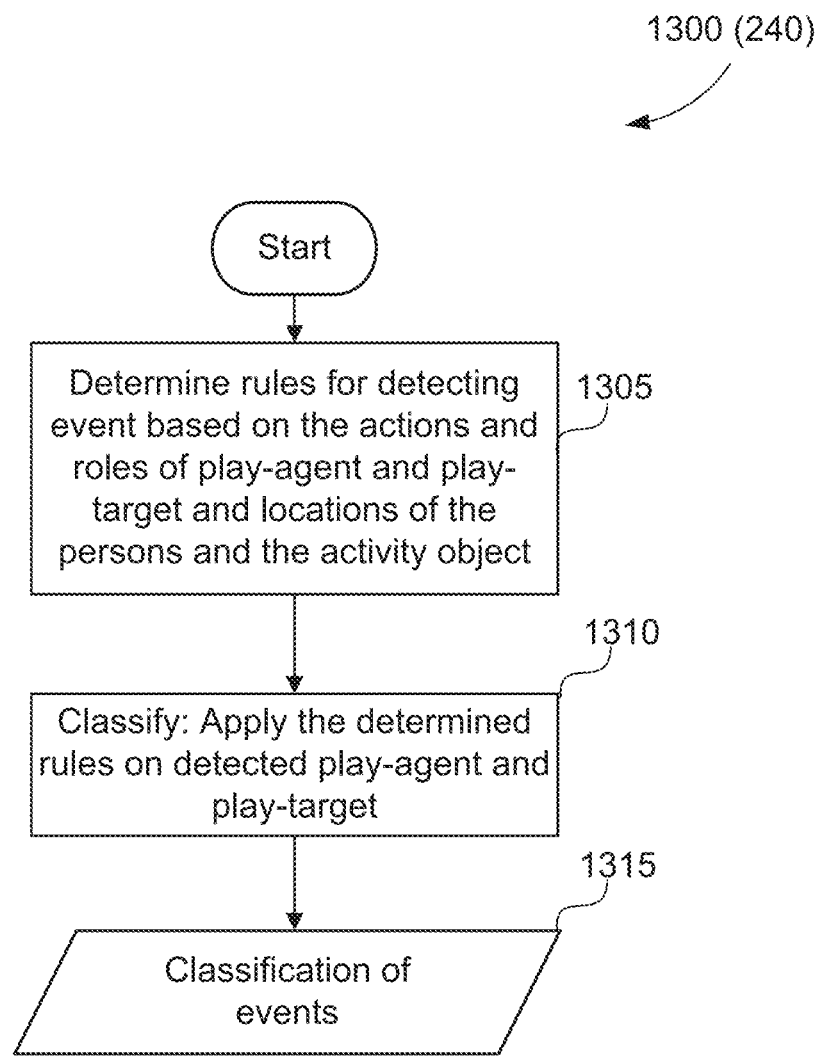
FIG. 13 shows a schematic flow diagram showing a method of classifying events based on rules.

FIG. 13 illustrates a schematic flow diagram of an alternative method 1300 of classifying the event based on recognised actions and roles, as executed in the event classification step 240 in FIG. 2. The method 1300 is typically implemented as one or more modules of the application 1433, stored in the memory 1406, controlled under execution of the processor 1405. The method 1300 relates to an alternative implementation of the step 240 to the method 1200.

The method 1300 uses the ontology associated with the target use-case. The method 1300 starts at a rule determination step 1305. Execution of the rule determination step 1305 formalises a set of logical arguments which can be used to classify the events. The method 1300 continues from step 1305 to a classification step 1310. The rule-based event classification step 1310 classifies the localised events using symbolic logical inferencing. In particular, for any event determined in the event localisation step 230, the rule-based event classification step 1310 uses logical inference to determine the rule which best matches the attributes of the events (for example, actions of the play-agent and play-target, roles of play-agent and play-target; the relative time or location of the event, etc.) and classifies the event as per the best matching rule. The step 1310 generates an event classification 1315 as output. The event attributes used in the rules determined in the rule determination step 1305 may include the determined roles of the play-agent and play-target as determined in the role determination step 235, the determined action of the play-agent and play-target as determined in the action detection step 225, the location of the play-agent and play-target as derived from the tracks determined in people tracking step 210 and, the location of the activity object (for example playing ball) during the event, as determined in the tracking step 215. Other attributes relevant to the target use-case in the rule determination step 1305 may also be used.

The set of rules determined in the rule-determination step 1305 is required make a complete set. That is, there must be at least one rule which could be applied to any event determined in the event localisation step 230. One way to achieve completeness of the rule set is to have a default event class and a default rule with the lowest priority. The default event class and default rule would be used to classify an event which cannot be matched to any of the other rules (with higher priority). If more than one rule could be matched to a detected event, the rules must have an associated priority so that the rule-based event classification step 1310 can prioritize the rules and determine the best matching rule which should be used to classify the event.

An example rule which can be used in soccer or futsal automated analysis to classify an event as Shoot is shown below.

---

(
   A1 is Play-agent &
   A2 is Play-target &
   (Leg-kick(A1) | Shoot-start(A1) | Pass-start(A1)) &
    (Leg-kick (A2) | Leg-receive(A2) | Dribble-moment(A2) |
    Head-receive(A2) |
    Head-hit(A2) | Goal-keeper-receive(A2) | Goal-keeper-throw(A2))
   &
   (A1. On-team ≠ A2. On-team) &
   A2. Is-goal-keeper
) ⇒ Shoot

---

In the example rule for classifying an even as Shoot, words in bold represent terms from ontology with precise definition, and the two attributes of Is-goal-keeper and On-team jointly define the 4 roles of goalkeeper of Home team, goalkeeper of Away team, a player (other than goalkeeper) of Home team, a player (other than goalkeeper) of Away team. In particular, the example rule indicates that for two interacting players (previously recognised as Play-agent and Play-target in event localisation step 230), the event should be classified as Shoot, if the recognised action of the Play-agent (for example an estimation of the action as determined using the classification method of action moment classification step 825) is one of Leg-kick or Shoot-start or Pass-start, and the recognised action of the Play-target (i.e., an estimation of the action as determined using the classification method of action moment classification step 825) is one of Leg-kick, Leg-receive, Dribble-moment, Head-receive, Head-hit, Goal-keeper-receive or Goal-keeper-throw, and Play agent and Play-target are from different teams, and the Play-target is a goalkeeper. For example, according to the example rule, even if the action of the Play-agent is estimated as Leg-kick and the action of the Play-target is also estimated as Leg-kick, the event should be classified as Shoot, if the Play-target is the goalkeeper of the opposite team. Effectively, the rules used at step 1305, such as the example rule Shoot, define relationships between an action by a play-agent with an activity object, and an associated action by a play-target to identify and classify an interaction or event.

Based on the analysis of the domain of interest and relevant ontology, corresponding event classification rules relevant to the other applications and use-case can be defined.

Returning to FIG. 2, after detection of all events in the input video clip 105, the method 200 progresses from step 240 to step The classification at step 240 allows relevant frames to be determined based on action moments and roles associated with the persons in the video clip 105. The step 245 selects the event as specified by the input pre-determined event details 101. The two details required from the input 101 are the event class and instance. An example is first instance of successful-goal-shoot event. The output of step 245 is the set frames representing the event, referred to as relevant frames for the pre-determined event. Any other events detected in the input video clip 105 are not selected.

Figure 15:
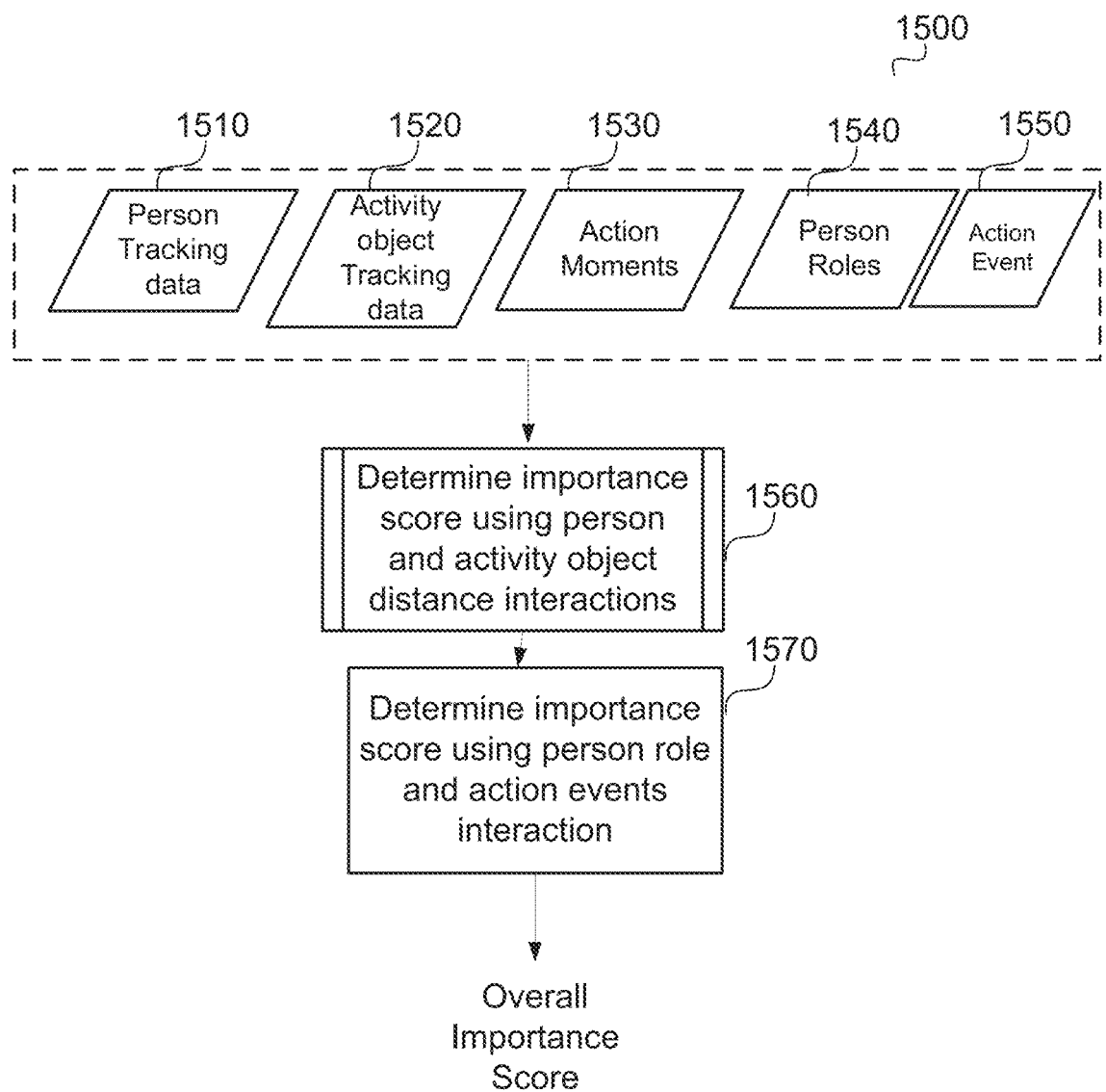
FIG. 15 shows a schematic flow diagram of a method to determine an overall importance score of a person.
Figure 16:
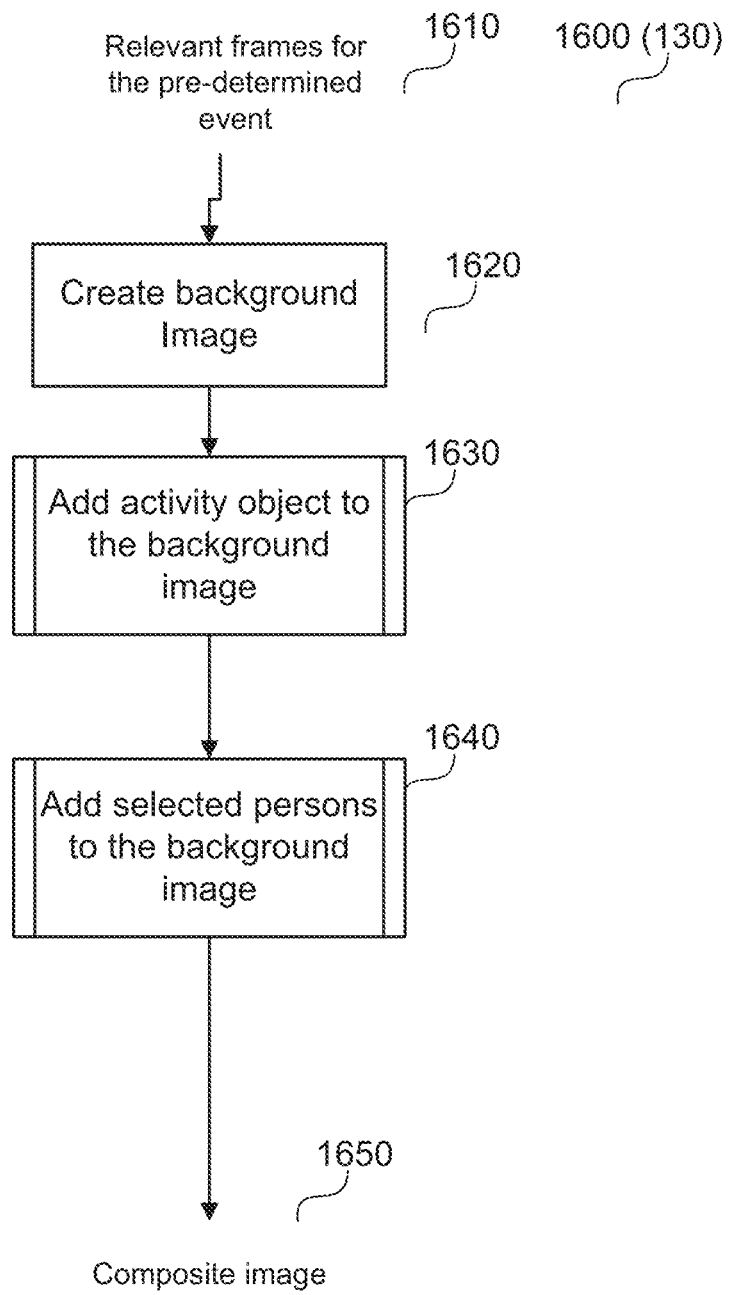
FIG. 16 shows a schematic flow diagram of a method of creating a composite image.
Figure 17:
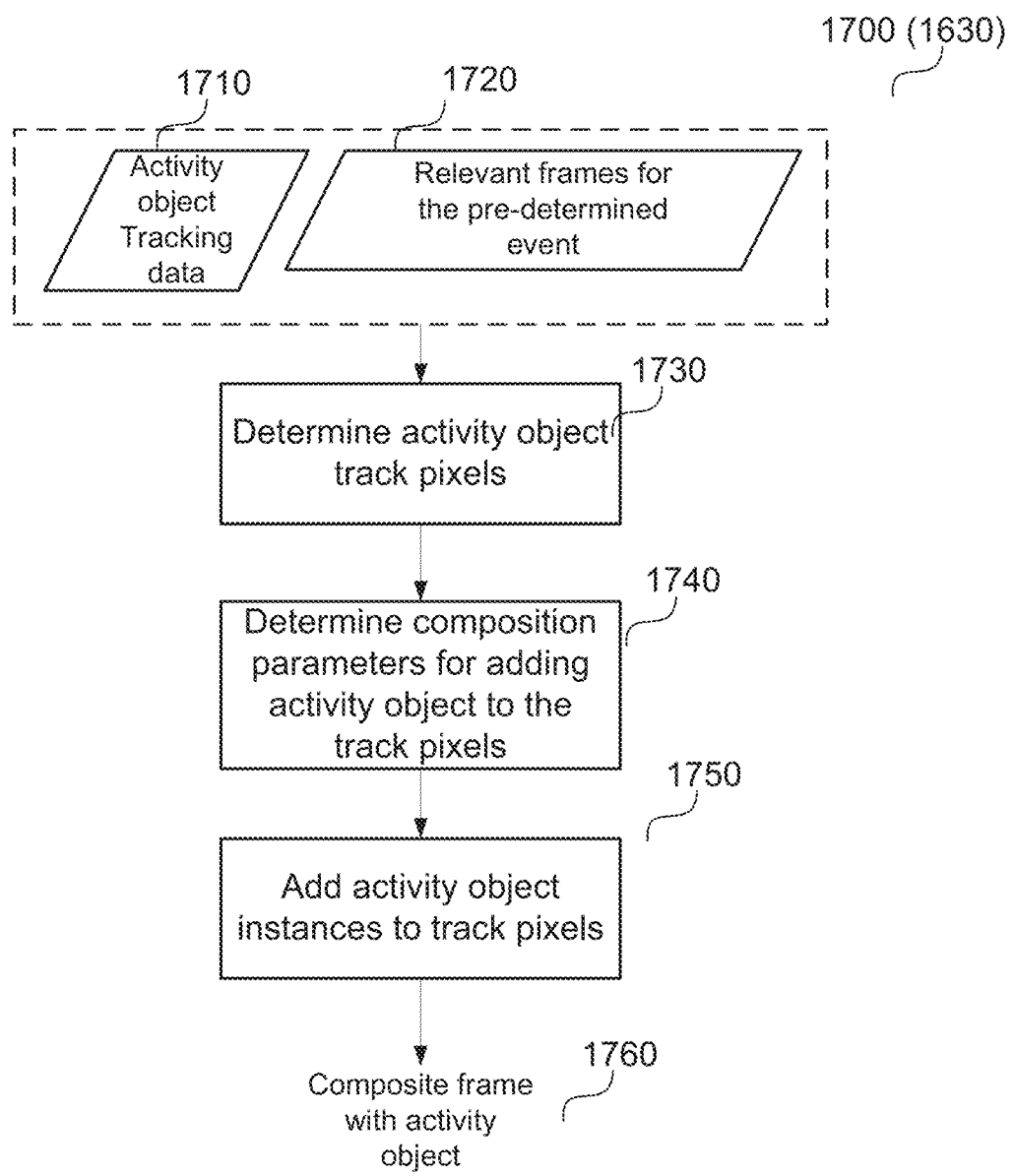
FIG. 17 shows a schematic flow diagram of adding activity object to the composite frame.
Figure 18:
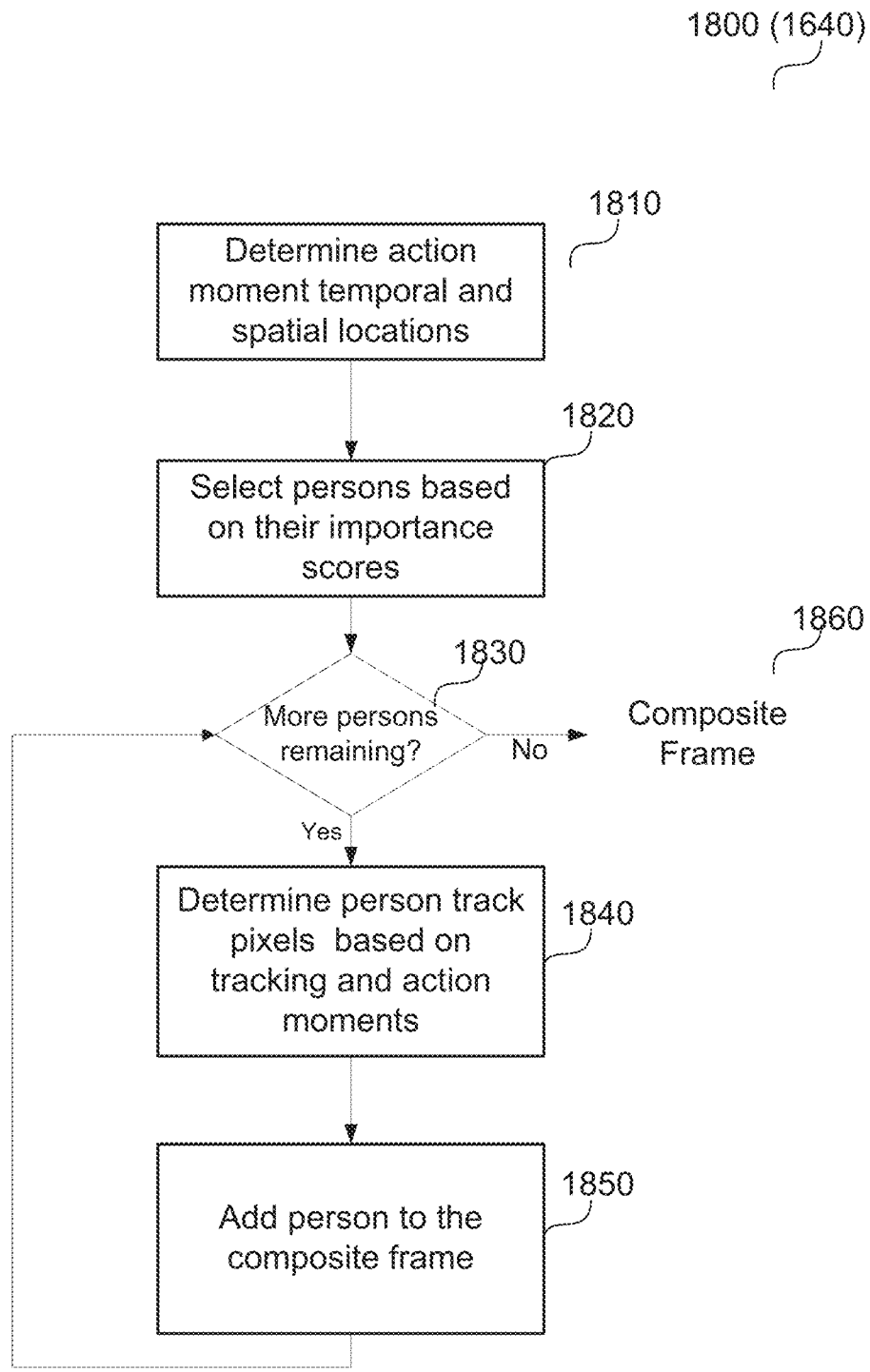
FIG. 18 shows a schematic flow diagram of adding persons to the composite frame.

The method of calculating importance score for persons, as implemented at step, is now described in detail using the method 1500 of FIG. 15. The method 1500 is typically implemented as one or more modules of the application 1433, stored in the memory 1406, controlled under execution of the processor 1405.

The method 1500 uses previously determined person tracking data 1510 (for example generated at FIG. 3), activity object tracking data 1520 (for example generated at FIG. 4), action moments 1530 (as determined at step 240), person roles 1540 (as determined at step 235), and action event frames 1550 (as determined at step 245). The method 1500 generates importance score for each person in each of the action event frames. In relation to generating an importance score for each person, $I_p$ represents the overall importance score of the p-th person among a total of P persons detected by the person detector during the pre-determined action event. In one arrangement, the overall importance score is divided as a combination of 2 parts of interactions, being a distance based importance score ($I_{p-BD}$) and role based importance score ($I_{p-Role}$).

The method 1500 starts at a determining step 1560. The step 1560 determines the distance based importance score ($I_{p-BD}$). The distance based importance score represents an importance score of a person p based on a distance between an activity object and a person interacting in the relevant frames of the action event. The distance based importance score is represented as $I_{p-BD}$. Operation of the step 1560 is described in further detail below in relation to a method 2100 of FIG. 21. Accordingly, the importance score of step 115 is determined based on a type of interaction detected between each of the persons with the activity object or ball.

The method 1500 continues from step 1560 to a determining step 1570. The importance score for each person in action moments of the selected frames can be further based on a role of each person. Execution of step 1570 determines the role based importance score ($I_{p-Role}$). The role based importance score determines importance score of a person p based on role of the person in the action event interactions. The importance score based on player role of a player in the action event interactions is represented as $I_{p-Role}$.

In one arrangement, the overall importance score for each person, $I_p$ is a weighted sum of the distance based importance score and the role based importance score as in Equation (3):

$$I_P = a*I_{P-BD} + b*I_{P-Role} \qquad (3)$$

In Equation (3), a and b are pre-determined weights. In one implementation, a=0.5 and b=0.5. In other arrangements, greater weight is afforded to one of importance relating to role and importance relating to interaction with n activity object. The weights a and b can be determined by experimentation for a given implementation. By using both role and distance for the activity object, both relevant to the type of the predetermined event, the importance score is accordingly determined based on a type of interaction.

In another arrangement, all persons whose role based importance score is higher than a pre-determined threshold such as 0.5 are selected. For the remaining persons, the overall importance score is zero. For the selected persons, the overall importance score is generated by using a weighted mean of the distance based importance scores and role based importance scores. Equation (4) is used for the overall importance score:

$$I_P = \begin{cases} a*I_{P\text{-}BD} + b*I_{P\text{-}Role} & \text{if } I_{P\text{-}Role} > I_{P\text{-}Role\text{-}Th} \\ 0 & \text{otherwise} \end{cases} \quad (4)$$

In Equation (4) $I_{p\text{-}Role\text{-}Th}$ is the predetermined threshold value of role-based importance score for a person.

Figure 21:
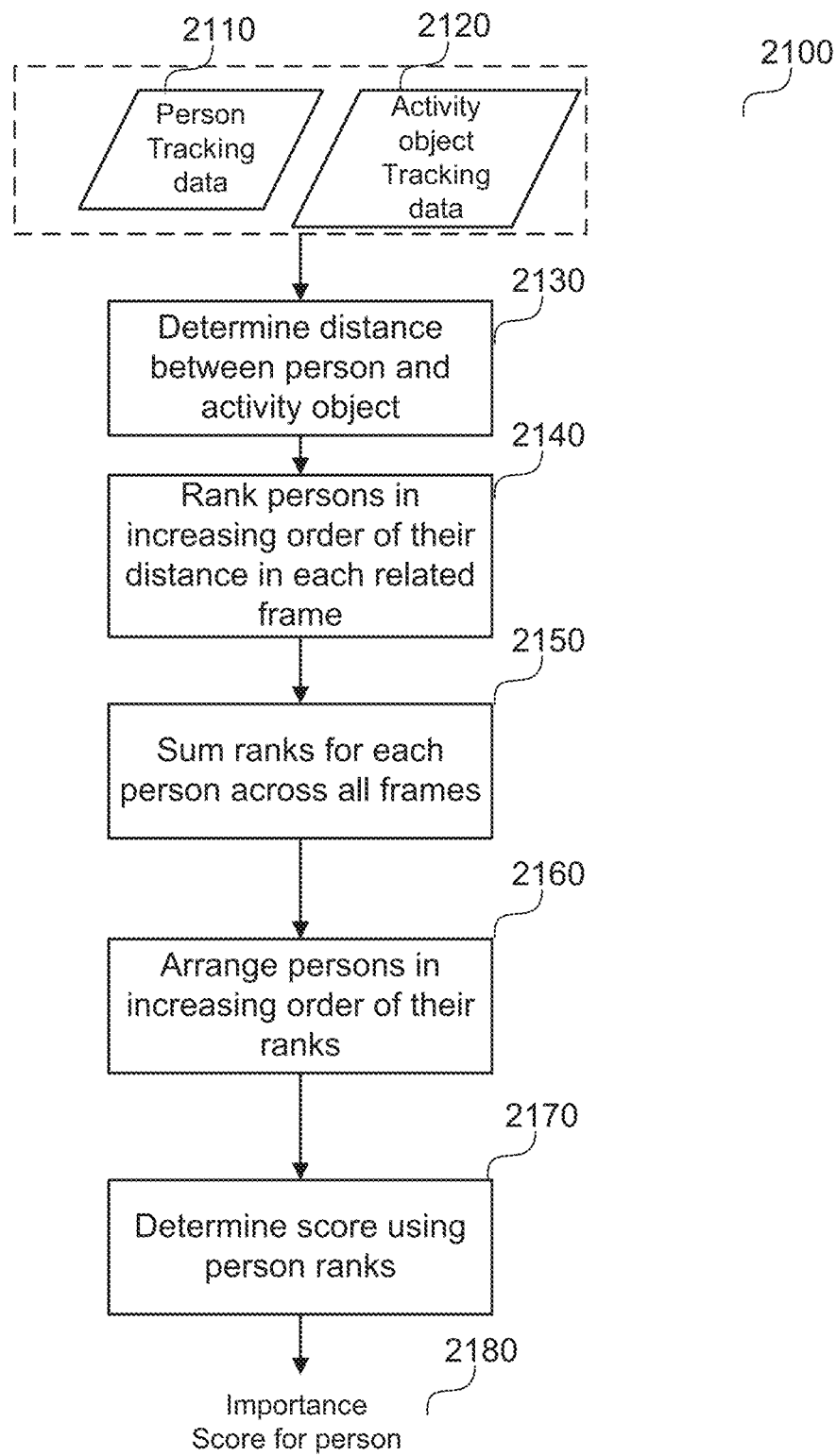
FIG. 21 shows a schematic flow diagram of determining an importance score of a player based on the player and a ball distance.

Operation of the step 1560 is now described in relation to FIG. 21 and the method 2100 of generating an importance score based on the activity object and person distance interactions. The method 1500 is typically implemented as one or more modules of the application 1433, stored in the memory 1406, controlled under execution of the processor 1405.

The method 2100 uses person tracking data 2110 and activity object tracking data 2120 for the relevant frames of the video clip 105 detected at step 110. The arrangements described operate on an assumption that there are P persons present in the relevant frames.

The method 2100 starts at a determining step 2130. For each frame and for each person in each frame, step 2130 operates to determine a distance between the person and the activity object. The distance between the person and the activity object may be determined in terms of coordinates or pixels, using known methods such as those described in relation to step 315.

The method 2100 progresses from step 2130 to a ranking step 2140. The persons in the frames are ranked from 1 to P depending on their distance with the activity object in step 2140.

The method 2100 progresses from step 2140 to a summation step 2150. Step 2150 sums all ranks for a person to generate an overall rank across all frames for the person. The method 2100 progresses from step 2150 to an arranging step 2160. Step 2160 operates to take input overall rank for all persons as determined at step 2150 and arranges the corresponding scores in increasing order of rank. Step 2170 normalizes the ranks and determines the distance based importance score for each person using Equation (5):

$$I_{P\text{-}BD} = 1 - \text{score}_p \quad \text{Equation (5)}$$

In Equation (5) $\text{score}_p$ represents the normalised score for the $p^{th}$ person. Accordingly the importance score for each of the plurality of persons can be based on a distance between each of the persons and the activity object in the determined plurality of frames corresponding to the predetermined event.

Step 1570 operates to determine a role based importance score based on a person's roles. In one arrangement, the role based importance score is determined based on determined person's roles. For example, in a game of futsal, the following roles are determined by the player role classifier:

TABLE 3

Actions events and related player roles

| Action event | Player roles |
| --- | --- |
| Successful-goal-shoot, unsuccessful-goal-shoot | Goal Attacker, defending goal-keeper, defender, player-attacking-team |
| Successful-pass, unsuccessful-pass | Passing-player, receiving-player |

The role based importance score is pre-determined for each player role for each action event. In one arrangement the following role based importance score is used:

TABLE 4

Action events, player roles and the role based importance score

| Action Event | Role | Importance score (role based) |
| --- | --- | --- |
| Successful-goal-shoot, unsuccessful-goal-shoot | Goal attacker | 1 |
| Successful-goal-shoot, unsuccessful-goal-shoot | Defending-goal keeper | 1 |
| Successful-goal-shoot, unsuccessful-goal-shoot | Defender | 0.5 |
| Successful-goal-shoot, unsuccessful-goal-shoot | Attacking-team-player | 0.3 |
| Successful-goal-shoot, unsuccessful-goal-shoot | Other players | 0.2 |
| Successful-pass, unsuccessful-pass | Passing-player | 1.0 |
| Successful-pass, unsuccessful-pass | Receiving-player | 1.0 |
| Successful-pass, unsuccessful-pass | Other players | 0.4 |

The players' roles are determined by the method previously described in relation to step 235. Execution of step 1570 concludes the method 1500 of determining overall importance score for persons.

Referring to FIG. 1, the method 100 moves from step 115 to a selection step 120. Step 120 operates to select a group of persons based on their importance score. In one arrangement, a fixed number of persons e.g. 2 persons, are selected who have the highest overall importance score. In another implementation, all persons whose overall importance score is higher than a pre-determined threshold, e.g. 0.5, are selected.

The method 100 continues from step 120 to a generating step 130. Step 130 operates to generate or create a composite frame as a representation of the action event. Operation of step 130 is now described in relation to a method 1600 of FIG. 16. Inputs to the method 1600 comprise related frames 1610 for the pre-determined event obtained from step 110.

The method 1600 starts with creating a background image in step 1620. In one implementation, the background image is determined by using the temporal median value at each pixel (also referred to as a median image). In another implementation, the background image is derived from a multi-mode scene model, such as a Mixture of Gaussian colours frequently seen at each pixel. In yet another implementation, the background image is learned from training data using a deep auto-encoder network (also known as background extraction network). In scenarios where multiple camera views are available, the preferred view is used for creating the background image. The selection of preferred view is explained before as part of description of step 830 of FIG. 8.

Figure 20:
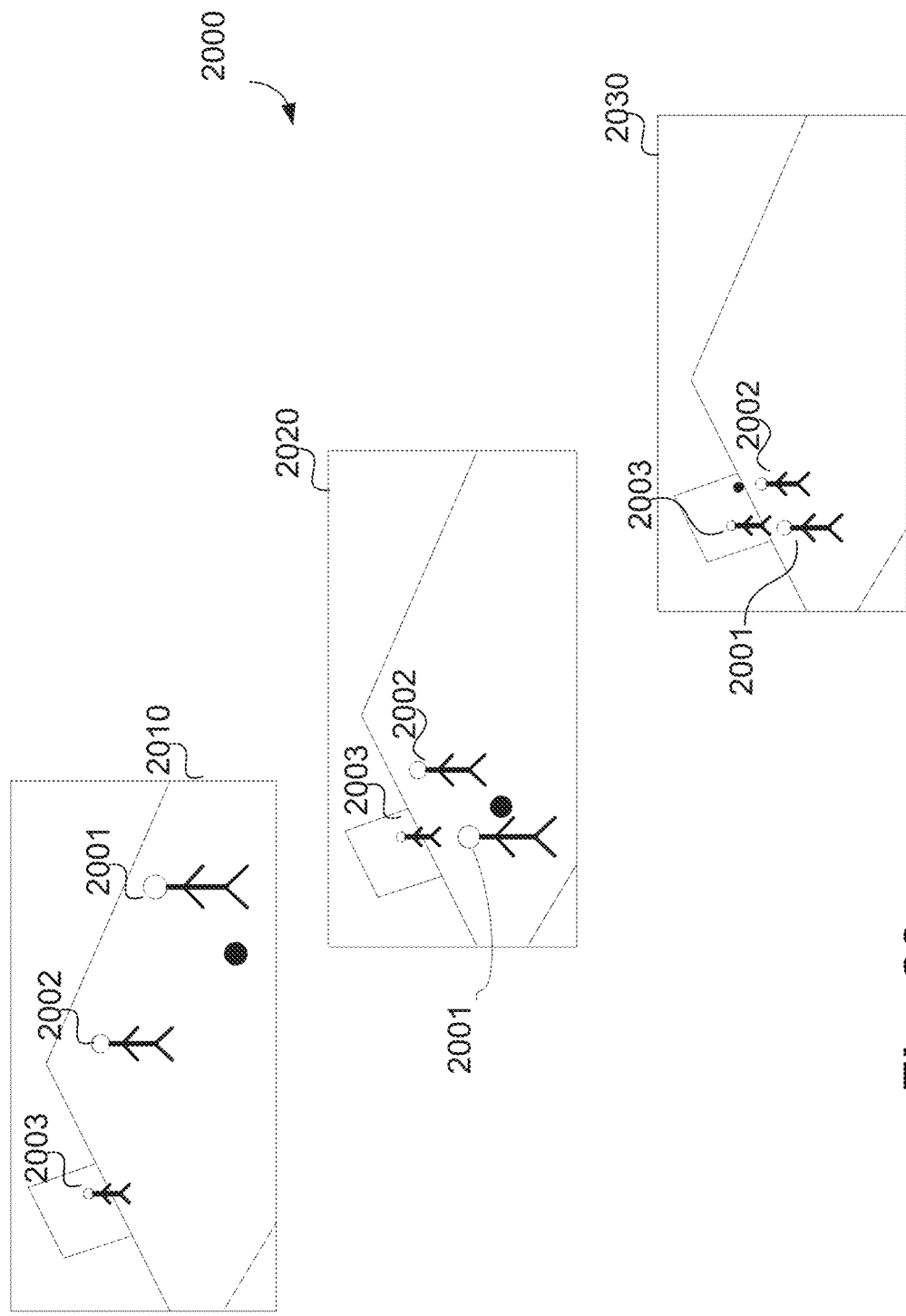
FIG. 20 shows two representative frames of a video clip.

For example, FIG. 20 shows a series 2000 of three frames among the relevant frames for the pre-determined event of successful-goal-shoot. In a frame image 2010, a player 2001 is approaching a goal 2040 with a ball 2050. Players 2002 and 2003 are from the defending team. In a subsequent frame image 2020, the player 2001 has moved closer to the goal 2040. In a further subsequent frame image 2030, a goal has occurred. The background image extracted at step 1620 can relate to the temporal median values at each pixel of each of the frame images 2010, 2020 and 2030, multi-mode scene modelling of the frame images 2010, 2020 and 2030 or from deep learning based methods.

The method 1600 continues from step 1620 to an activity addition step 1630. Execution of step 1630 adds the activity object (e.g. ball) to the background image. Operation of the step 1630 is further described in relation to FIG. 17 for method 1700.

The method 1700 receives activity object tracking data 1710 (from 420 of FIG. 4) for relevant frames 1720 of the pre-determined event as inputs. The method 1700 is typically implemented as one or more modules of the application 1433, stored in the memory 1406 and controlled under execution of the processor 1405.

Figure 19A:
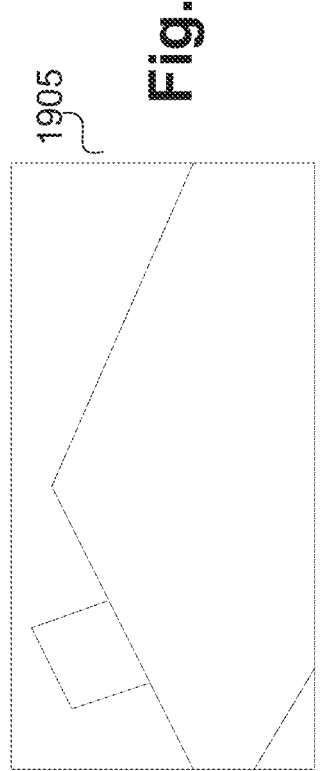
FIGS. 19A to 19D show the background image, the ball trajectory and varying transparency to add a ball to a composite frame.
Figure 19B:
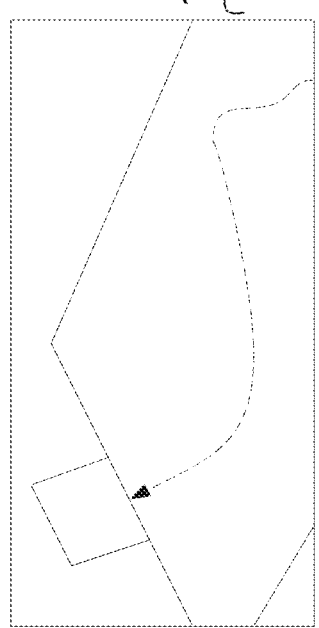
Figure 19C:
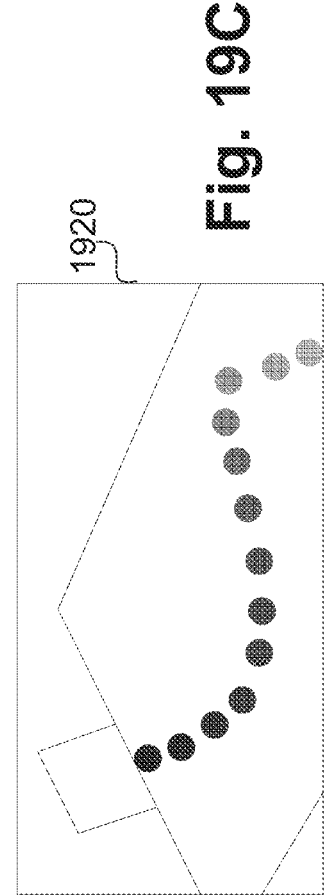

The method 1700 starts at a determining step 1730. The step 1730 operates to pick activity object track pixels using the ball tracking data 1710. In other words, the step 1730 operates to select or pick pixels of the frames 1710 associated with the ball (activity object). FIGS. 19A to 19C show a set of frames used to generate a summary plot of motion of a ball in a composite frame using an associated transparency arrangement 1930 shown in FIG. 19D. A frame 1905 of FIG. 19A relates to a background image frame generated at step 1620 of FIG. 6. A frame 1910 (FIG. 19B) shows the frame 1905 including track pixels using a dotted line, as resultant from execution of step 1730.

Figure 19D:
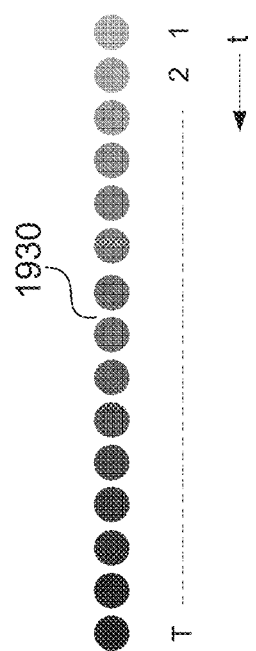

The method 1700 continues from step 1730 to a determining step 1740. Execution of step 1740 determines composition parameters required to add the activity object to the track pixels. In one implementation, there are two composition parameters used to add the activity object, being the subset of pixels from the activity object track pixels where the activity object will be superimposed on to the background frame and the transparency of the activity object used. The transparency arrangement 1930 shows a variation of different transparency values used to convey or represent the time ordering of the ball instances. The higher value of transparency is used for earlier frames and low value of transparency is used in later frames. In one implementation, the transparency parameter is sampled linearly between 70% to 0%. The arrangement 1930 of FIG. 19D shows a transparency variation from a frame at t=1 to t=T where T represents the total number of frames relevant to the action. The graded use of transparency of the arrangements 1930 allows a perception of temporal trajectory of the ball. In another implementation, variation in colour spectra and/or shading are used to convey a perception of temporal trajectory of an activity object.

After determining the composition parameters at step 1740, the method 1700 continues to an addition step 1750. Step 1750 adds activity object images extracted from the relevant frames to the background frame (for example 1905) using the parameters determined in step 1740. The resultant composite frame with activity object is output, indicated as 1760 in FIG. 17. A composite frame 1920 of FIG. 19C showing different temporal positions of the ball (activity object) using the arrangement 1930, shown in FIG. 19D, is an output of the method 1700.

After adding the activity object to the background image, the method 1600 continues from step 1630 to a step 1640. Step 1640 adds persons to the composite frame. Operation of the step 1640 is now described in relation to a method 1800 in FIG. 18. The method 1800 is typically implemented as one or more modules of the application 1433, stored in the memory 1406 and controlled under execution of the processor 1405.

The method 1800 starts with a determining step 1810. The temporal and spatial locations of action moments in the relevant frames are determined in step 1810. The temporal location is determined based on action moment detection output generated by the method 600 described in FIG. 6. The spatial location is determined by using the person's spatial location which is associated with the detected action moment.

After determining the temporal and spatial locations, the method 1800 moves to a selection step 1820. The step 1820 selects persons based on the associated importance score among all persons selected by the step 120 of the method 100 described in FIG. 1. In one arrangement, the person who has the highest importance score is selected first and selection continues based on importance score. The method 1800 processes the selected persons one at a time. The method 1800 proceeds from step 1820 to a check step 1830. Step 1830 determines of there are more persons remaining the frames to be processed. If there are more persons remaining ("Yes" at step 1830), the method 1800 continues from step 1830 to a determining step 1840. The module 1840 identifies the track for the selected person using action moment location and person tracking data. The method 1800 continues form step 1840 to an addition step 1850. The step 1850 adds the selected person(s) at selected action moments to the composite frame.

The process of adding the selected person to the composite frame at step 1850 is similar to the process of adding the activity object to the composite frame at steps 1740 and 1750 of the method 1700. The composition parameters of the person such as transparency, colour are determined based on importance score of the person and varied to represent temporal occurrence, similarly to step 1740. In one arrangement, only transparency is determined based on the temporal characteristics of the person with respect to the action moment.

One or more low importance score action moments can be omitted at step 1850 if adding the low importance score moments results in cluttered output. In one arrangement, cluttering is estimated by calculating the percentage of number of pixels occupied by persons in the composition frame with respect to total pixels in the composite frame and comparing the percentage with a pre-determined clutter threshold. In one implementation, a value of 0.7 (70%) is used as the clutter threshold. In some instances, not all high-score action moments need to be displayed to improve presentation of the composite image.

Figure 22A:
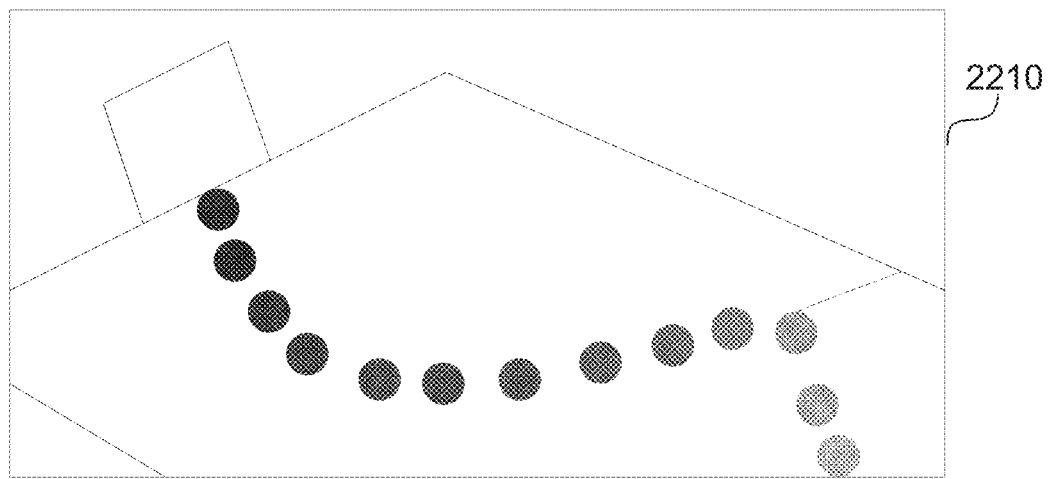
FIGS. 22A to 22C show example images of adding players to a composite image.
Figure 22B:
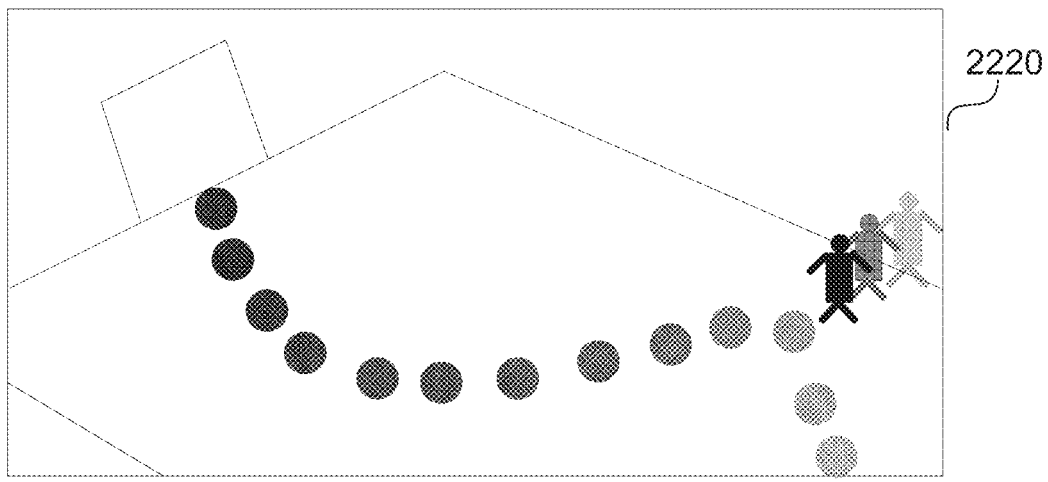
Figure 22C:
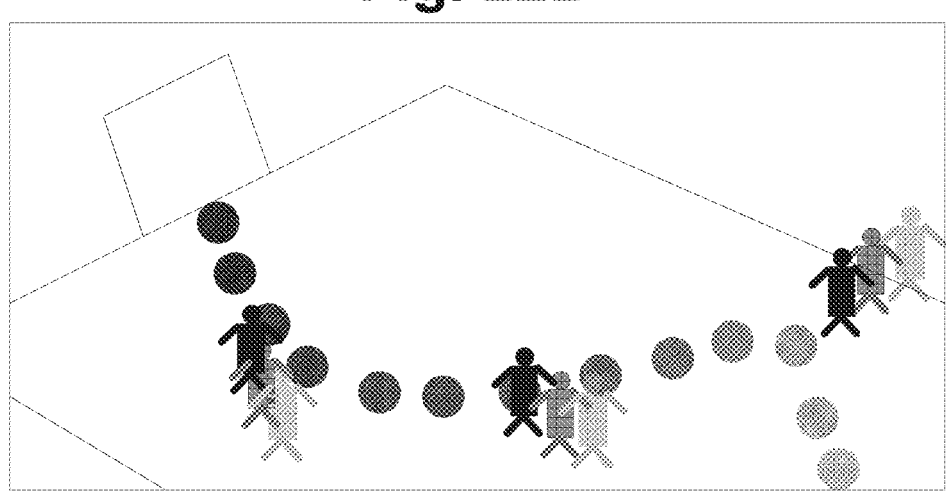

An example of adding persons to a composite image is shown in FIGS. 22A to 22C. In FIG. 22A a frame 2210 represents a composite frame after execution of the ball track addition step 1760. In FIG. 22B, a composite frame 2220 has a series of player images added using similar parameters (tracking pixels) and transparency for the player. In FIG. 22C, a composite frame 2230 represents an instance where two other action moments are selected and the corresponding players are added to the composite frame. As shown by FIG. 22C, the composite frame can comprise a series of instances of the activity object and one or more persons at selected action moments superimposed on a background image.

In one arrangement, all action moments are selected and added in the composite frame. In other arrangements, action moments are selected based on the importance score of the persons associated with the action moments. For example, an action moment is selected if the importance score of persons associated with the action moment is higher than a pre-determined threshold such as 0.4. The method 1800 continues until there are more persons to add to the composite frame ("No" at step 1830).

Figure 23:
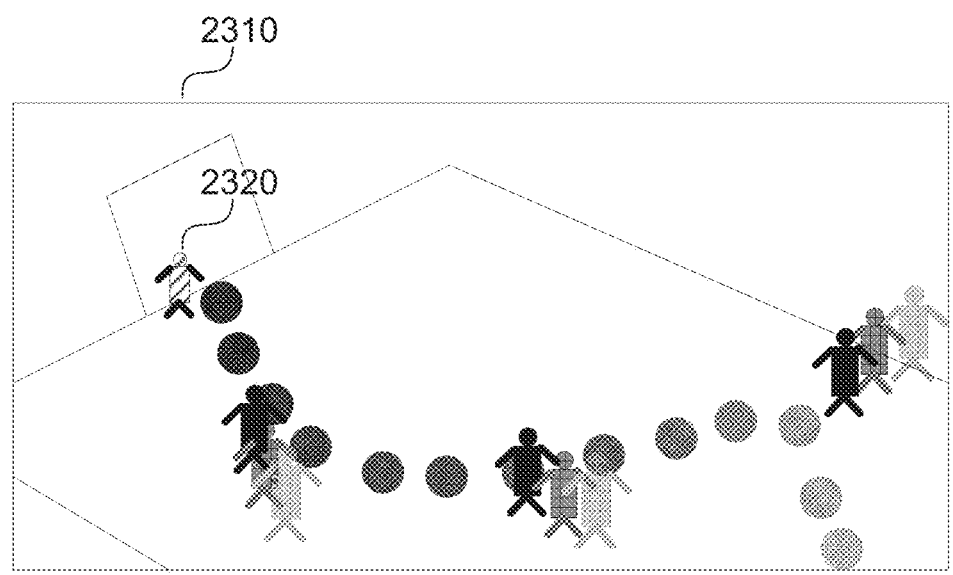
FIG. 23 shows an example of adding a player of a particular role (goal keeper) to the composite image.

FIG. 23, shows an example composite frame 2300 for a scenario when the goal keeper is added for a pre-determined event of "successful-goal-shoot". The method 1800 is finished when all selected persons (based on each person's individual overall importance score across all the relevant frames selected at step 110) have been added to the composite frame.

The arrangements described are applicable to the computer and data processing industries and particularly for the image and video processing industries.

The arrangements described for generating a sports summary have several advantages. The methods described are applicable to events with multiple persons interacting with an activity object. For example, the methods described are applicable to sports with multiple players interacting with a ball. The methods described do not require pre-determined templates for the event and detects relevant frames and moments automatically. The proposed methods also select players used to generate a summary frame based on the players' importance scores relative to a pre-determined event. The importance score of a person in an event signifies importance of the person in the event and hence assists in creating a more relevant summary of the event.

The proposed method for generating a summary of a video action is not restricted to sports video but are also applicable to a wide range of applications such as for video surveillance, traffic incident analysis, work-flow analysis in office environments, and the like. An example of a surveillance use-case is summarisation of abnormal behaviours of a suspect. Drunken behaviour or malicious damage to activity objects such as cars and properties can be captured, annotated and summarised in a concise format of a picture. In this case, the car being damaged is equivalent to the activity object. The picture can then be used for identification, as evidence in court, or as an accompanying proof to an arrest warrant or fine. Another example of a surveillance use-case is to analyse and summarise the shoplifting activity by a group of collaborating people. Stolen goods changing hands amongst the thieves in such an implementation act like the activity object in sports. Interactions amongst people and the stolen goods are detected and the group of thieves can be identified. Roles of persons in a security application could include main person(s) involved in the incident such as one or more persons who damaged a car and supporting persons such as people who were with the main person. Other examples of activity objects in surveillance applications could include the main object involved in the activity for example, the car which is damaged or the stolen goods.

Another example in traffic incident summary is of interest to the insurance industry. Video footages from a network of surveillance cameras around the point of traffic accident can provide a summary of the accident from different viewpoints and from a novel viewpoint such as a bird-eye view. Prior to the point of impact, trajectories, speed, and acceleration of involving vehicles and pedestrians can be conveyed on the summarised image using colour-coded tracks, motion blur, object transparency, arrows, or text annotations. In traffic applications, roles of persons would typically relate to pedestrians and drivers of cars involved and activity objects would typically relate to cars involved in an accident.

Even in a civil environment such as an office, video action summarisation can help optimising a floor plan design to improve work flow. Prior to new office partition and utility room placement, the interactions amongst office workers and their office equipment can be monitored. By tracking individual people during their everyday activities, common work patterns, social interactions, and walk paths are gathered. Office workers can then be assigned desk to encourage cross-project collaboration and improve efficiency of everyday tasks. In office applications, roles of persons would typically relate to office workers and activity objects would typically relate to office equipment or facilities.

The foregoing describes only some embodiments of the present invention, and modifications and/or changes can be made thereto without departing from the scope and spirit of the invention, the embodiments being illustrative and not restrictive.

The invention claimed is:

1. A computer-implemented method of generating a composite frame from a video capturing a plurality of persons, the method comprising:
   determining a plurality of frames corresponding to occurrence of a predetermined event in the video;
   determining an importance score for each of the plurality of persons in the determined plurality of frames, the importance score determined based on a type of interaction detected between each of the plurality of persons with an activity object;
   selecting one or more of the plurality of persons based on the determined importance score; and
   generating a composite frame of the predetermined event comprising a series of instances of the activity object and one or more of the plurality of selected persons, superimposed on a background image.

2. The method according to claim 1, wherein the plurality of frames corresponding to the predetermined event are determined based on action moments and roles associated with the plurality of persons.

3. The method according to claim 1, wherein the importance score for each of the plurality of persons is determined based on a distance between each of the persons and the activity object in the determined plurality of frames corresponding to the predetermined event.

4. The method according to claim 1, wherein the importance score for each of the plurality of persons is further based on a role of the person in the determined plurality of frames corresponding to the predetermined event.

5. The method according to claim 1, wherein the background image is derived from a plurality of frames corresponding to the predetermined event using temporal median at each pixel.

6. The method according to claim 1, wherein the background image is derived from a plurality of frames corresponding to the predetermined event using multi-mode scene modelling.

7. The method according to claim 1, wherein the background image is derived from a plurality of frames corresponding to the predetermined event using a deep auto-encoder network.

8. The method according to claim 1, wherein the importance score for each of the plurality of persons is further based on a role of the person in the determined plurality of frames corresponding to the predetermined event, and wherein time ordering of the activity object and the one or more persons included in the composite frame is represented by a variation in transparency.

9. The method according to claim 1, wherein the importance score for each of the plurality of persons is further based on a role of the person in the determined plurality of frames corresponding to the predetermined event, and wherein time ordering of the activity object and the one or more persons included in the composite frame is represented by varying colour spectra or shading.

10. The method according to claim 1, wherein the type of interaction is based on at least one of the predetermined event, a distance between the activity object and the plurality of persons, and a role of the plurality of persons.

11. The method according to claim 1, wherein generating the composite frame further comprises estimating clutter of the composite frame by determining a percentage of number of pixels occupied by the plurality of selected persons in the composite frame with respect to total pixels in the composite frame.

12. The method according to claim 1, wherein generating the composite frame further comprises estimating clutter of the composite frame by determining a percentage of number of pixels occupied by the plurality of selected persons in the composite frame with respect to total pixels in the composite frame, the method further comprising excluding an instance of the event from the composite frame based on a low importance score associated with the instance and the estimated clutter being above a predetermined threshold.

13. The method according to claim 1, further comprising detecting one or more action moments captured in the video using a trained classifier and determining the frames based on the action moment corresponding to the predetermined event.

14. The method according to claim 1, wherein determining the plurality of frames corresponding to occurrence of the predetermined event comprises determining tracks relating to each of the plurality of persons and the activity object in the video and detecting occurrence of an action moment using the determined tracks.

15. The method according to claim 1, wherein the importance score is determined based upon an aggregate importance score calculated for each person across all of the determined frames corresponding to the predetermined event.

16. The method according to claim 1, wherein the plurality of persons are players of a ball sport, the activity object is the ball and the predetermined event is one of a plurality of events associated with the ball sport.

17. A non-transitory computer readable storage medium storing program instructions for generating a composite frame from a video capturing a plurality of persons, the program comprising:

code for determining a plurality of frames corresponding to occurrence of a predetermined event in the video;
code for determining an importance score for each of the plurality of persons in the determined plurality of frames, the importance score determined based on a type of interaction detected between each of the plurality of persons with an activity object;
code for selecting one or more of the plurality of persons based on the determined importance score; and
code for generating a composite frame of the predetermined event comprising a series of instances of the activity object and one or more of the plurality of selected persons, superimposed on a background image.

18. Apparatus for generating a composite frame from a video capturing a plurality of persons, comprising:
a processor; and
a memory device storing a software program for directing the processor to perform a method comprising the steps of:
determining a plurality of frames corresponding to occurrence of a predetermined event in the video;
determining an importance score for each of the plurality of persons in the determined plurality of frames, the importance score determined based on a type of interaction detected between each of the plurality of persons with an activity object;
selecting one or more of the plurality of persons based on the determined importance score; and
generating a composite frame of the predetermined event comprising a series of instances of the activity object and one or more of the plurality of selected persons, superimposed on a background image.

19. A system comprising:
at least one image capture devices for capturing video of a plurality of persons;
a processor; and
a memory device storing a software program for directing the processor to perform a method comprising the steps of:
determining a plurality of frames corresponding to occurrence of a predetermined event in the video;
determining an importance score for each of the plurality of persons in the determined plurality of frames, the importance score determined based on a type of interaction detected between each of the plurality of persons with an activity object;
selecting one or more of the plurality of persons based on the determined importance score; and
generating the composite frame of the predetermined event comprising a series of instances of the activity object and one or more of the plurality of selected persons, superimposed on a background image.

* * * * *